US010091731B2

United States Patent
Gore et al.

(10) Patent No.: US 10,091,731 B2
(45) Date of Patent: *Oct. 2, 2018

(54) METHOD AND APPARATUS FOR DETECTING PACKET

(71) Applicant: Samsung Electronics Co., Ltd., Suwon-si (KR)

(72) Inventors: Ashutosh Deepak Gore, Banglore (IN); Sujit Jos, Banglore (IN); Jinesh P. Nair, Banglore (IN); Chang Soon Park, Chungju-si (KR); Kiran Bynam, Jalahalli (IN); Young Jun Hong, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/424,023

(22) Filed: Feb. 3, 2017

(65) Prior Publication Data

US 2017/0230145 A1  Aug. 10, 2017

(30) Foreign Application Priority Data

Feb. 5, 2016 (IN) .............................. 201641004229
Dec. 27, 2016 (KR) ........................ 10-2016-0180204

(51) Int. Cl.
  *H04W 52/02* (2009.01)

(52) U.S. Cl.
  CPC ... *H04W 52/0229* (2013.01); *H04W 52/0238* (2013.01); *H04W 52/0245* (2013.01); *H04W 52/0225* (2013.01)

(58) Field of Classification Search
  CPC . G11B 5/59622; H03F 1/3211; H04L 1/0045; H04L 27/2647; H04L 1/0091
  USPC ............................... 375/219, 297; 455/127.1
  See application file for complete search history.

(56) References Cited

U.S. PATENT DOCUMENTS

| | | | |
|---|---|---|---|
| 2009/0310651 A1* | 12/2009 | Amde | H04B 1/7075 375/147 |
| 2010/0045508 A1 | 2/2010 | Ekbal et al. | |
| 2011/0019782 A1* | 1/2011 | Kobayashi | H04L 27/2659 375/344 |
| 2011/0075763 A1 | 3/2011 | Shim et al. | |
| 2013/0107893 A1 | 5/2013 | Zhang | |
| 2014/0293808 A1* | 10/2014 | Tsai | H04W 24/02 370/252 |

FOREIGN PATENT DOCUMENTS

KR  10-1124814 B1  3/2012
KR  10-1188834 B1  10/2012
(Continued)

*Primary Examiner* — Leila Malek
(74) *Attorney, Agent, or Firm* — NSIP Law

(57) ABSTRACT

Disclosed is a method and apparatus to detect an intended packet by a sliding intermediate frequency (SIF) coherent ultra low power (ULP) wireless receiver. The method includes detecting a transition from a noise period to a signal period in a pair of input sequences received, dynamically adjusting a gain of the pair of input sequences in response to the signal period being initiated, distinguishing an intended packet from packets received in preambles included in the pair of input sequences, and compensating for a carrier frequency offset of the intended packet in the signal period.

20 Claims, 26 Drawing Sheets

(56) References Cited

FOREIGN PATENT DOCUMENTS

| | | |
|---|---|---|
| KR | 10-2013-0027001 A | 3/2013 |
| KR | 10-2015-0051162 A | 5/2015 |
| WO | WO 2011/018626 A2 | 2/2011 |

* cited by examiner

100

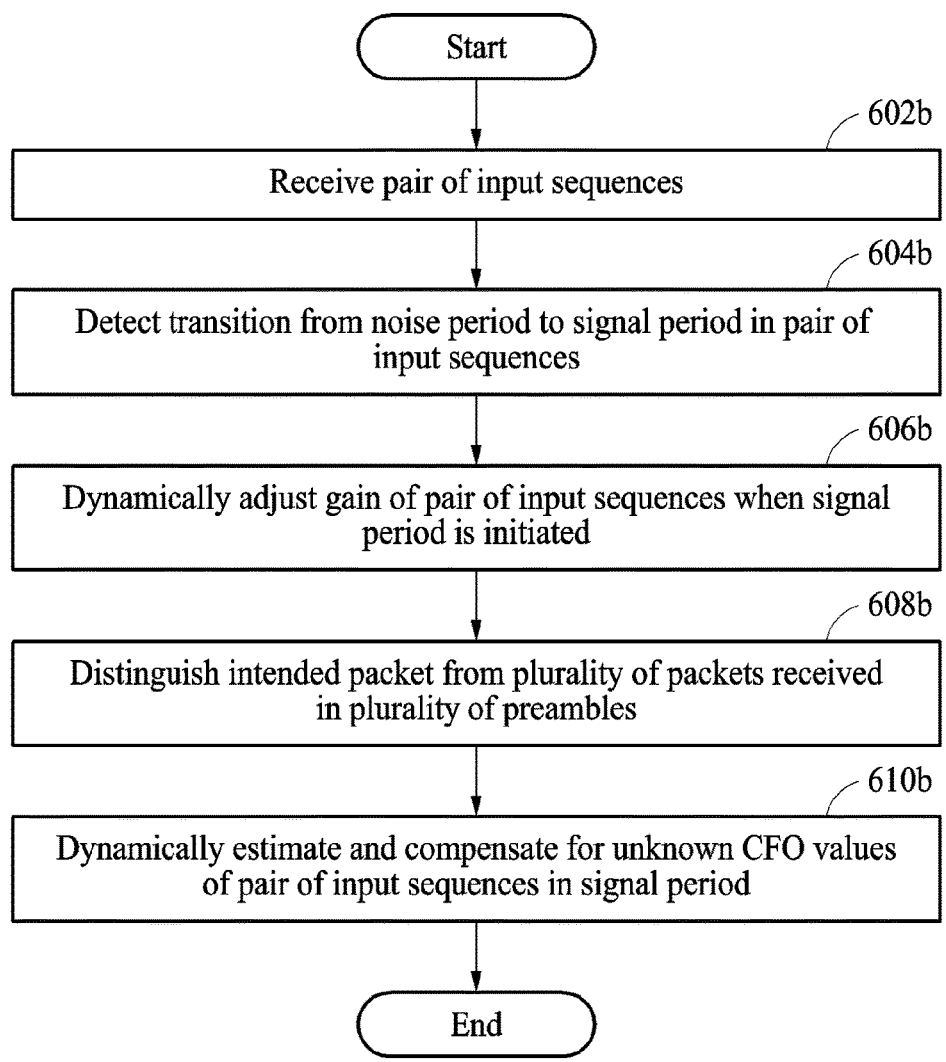

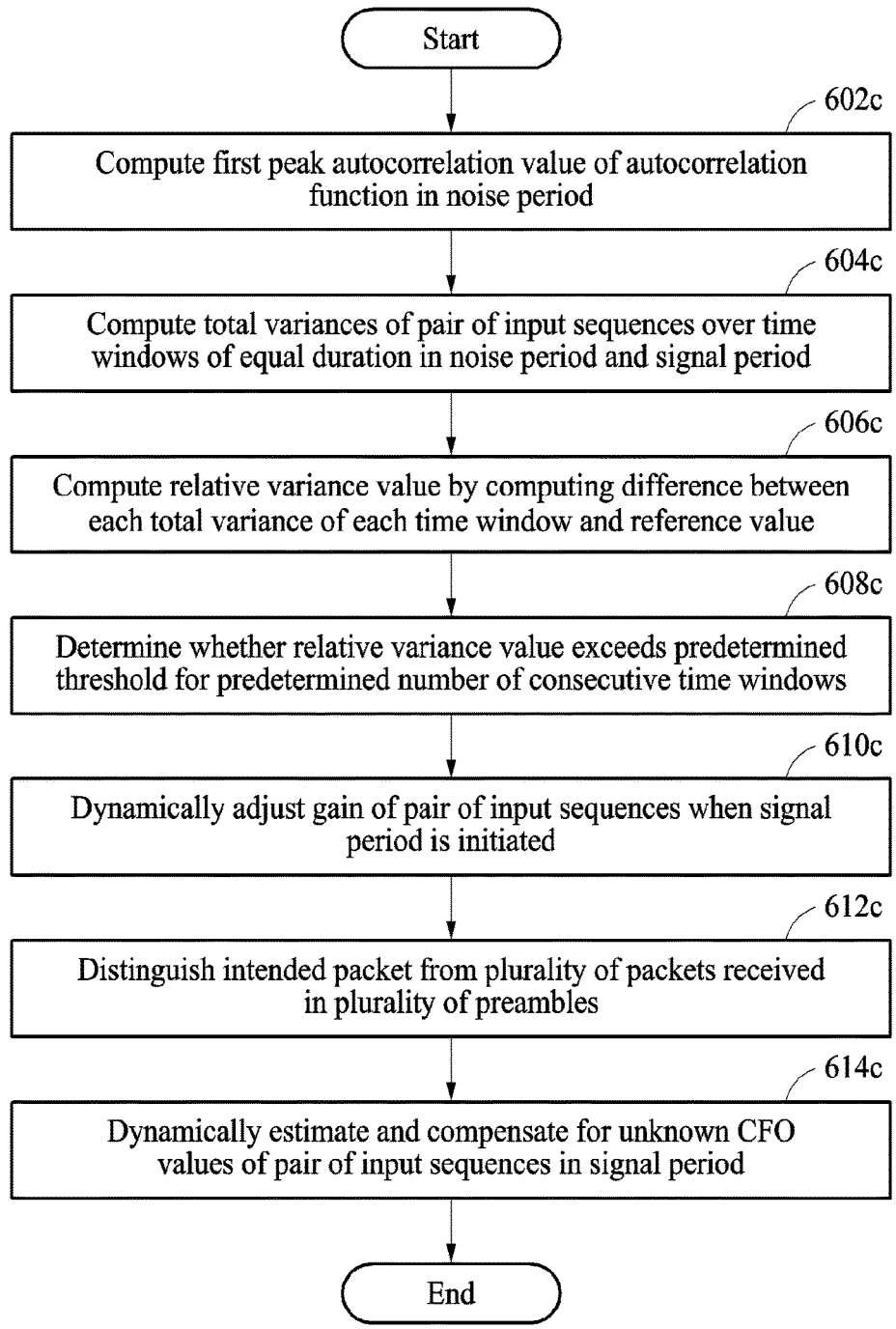

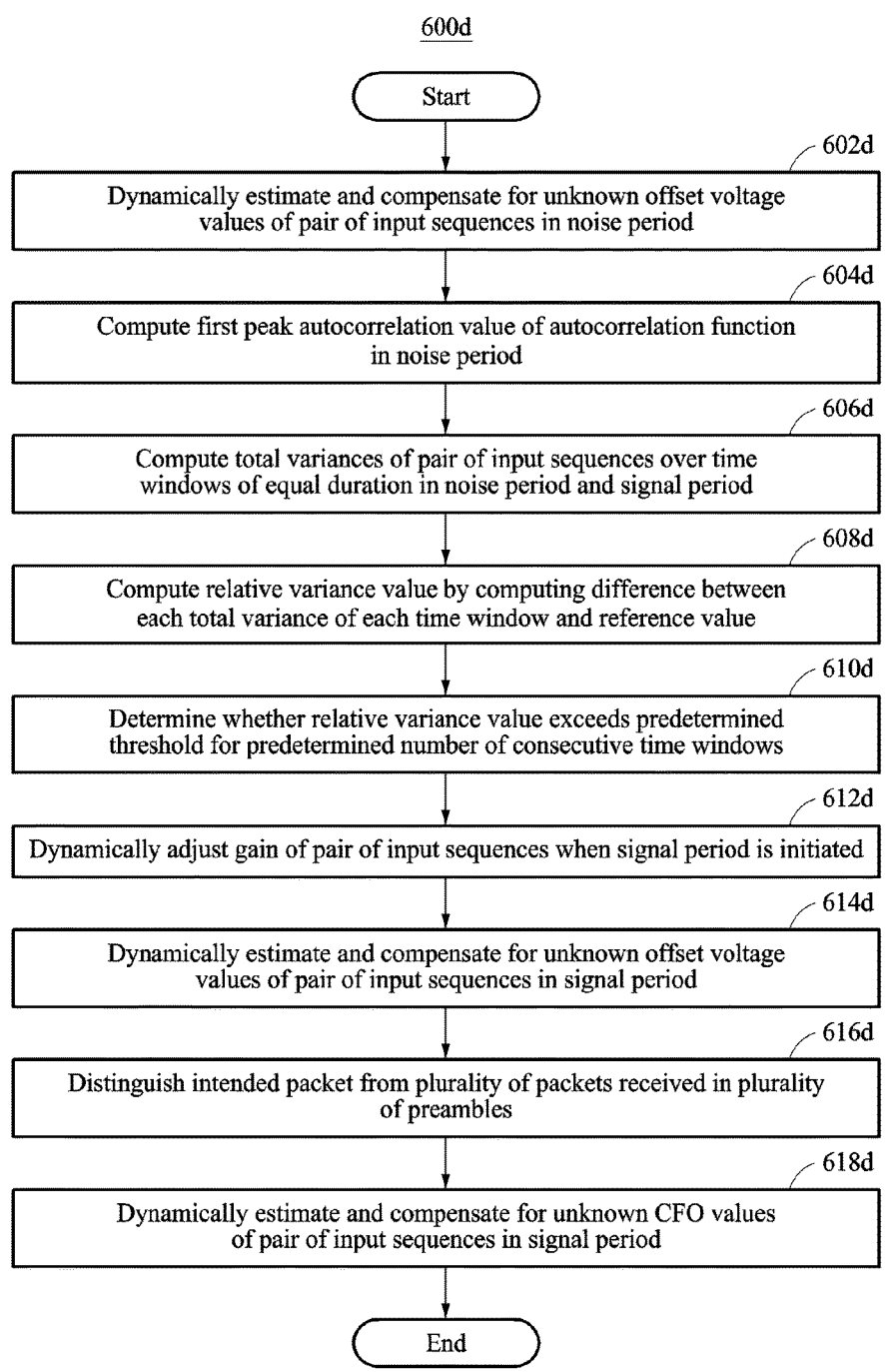

Basis of IEEE 802.15.4q physical layer packet detection

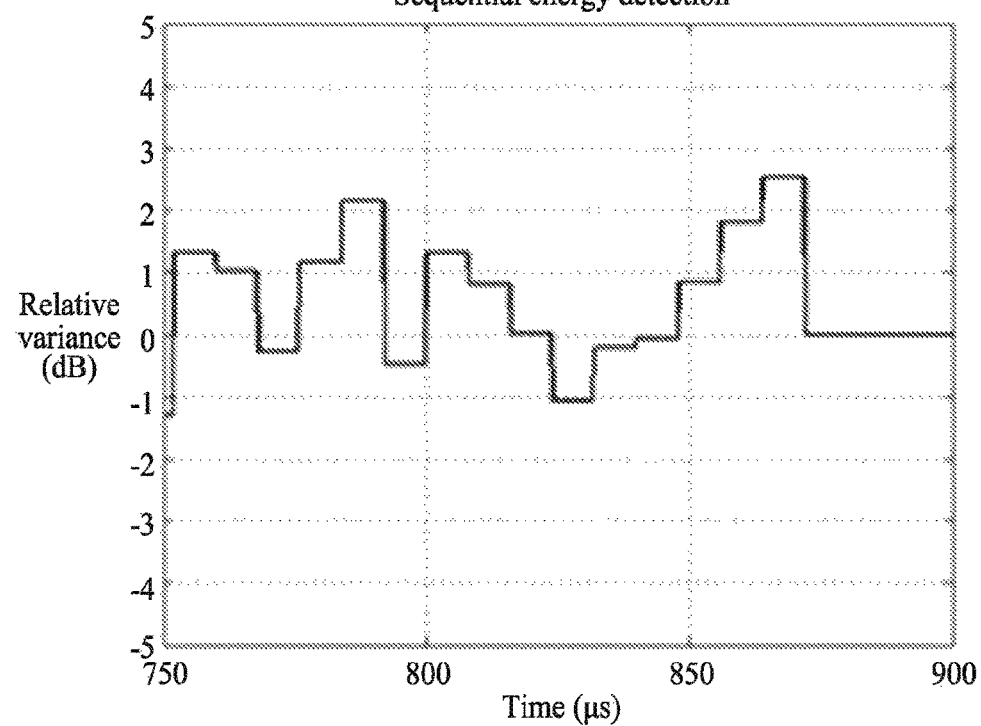

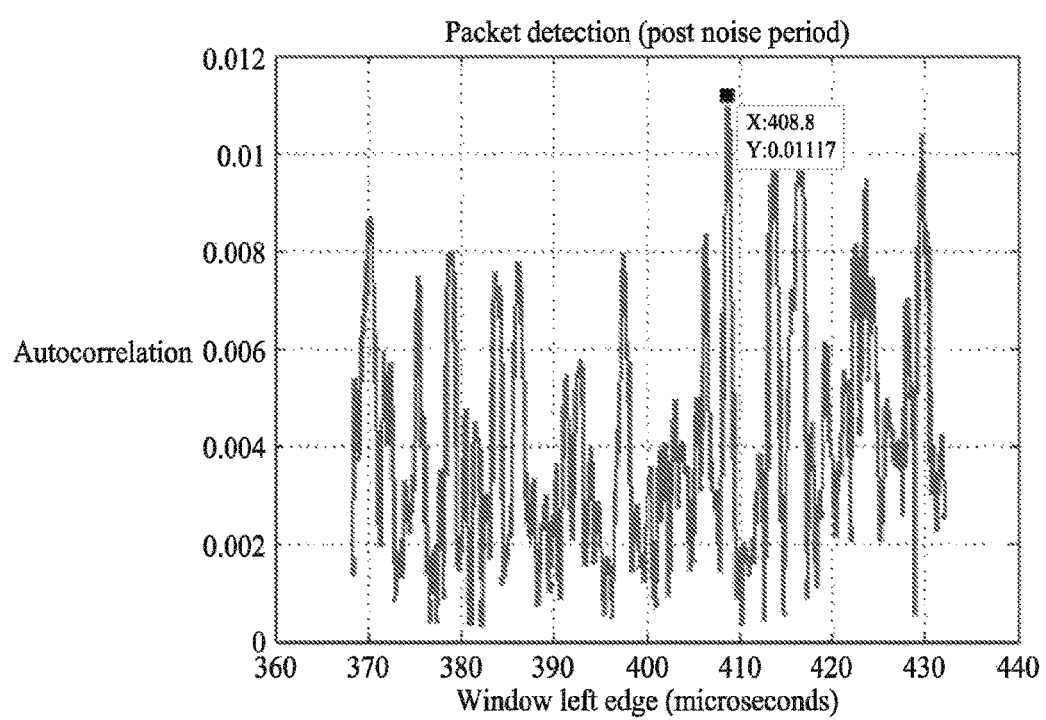

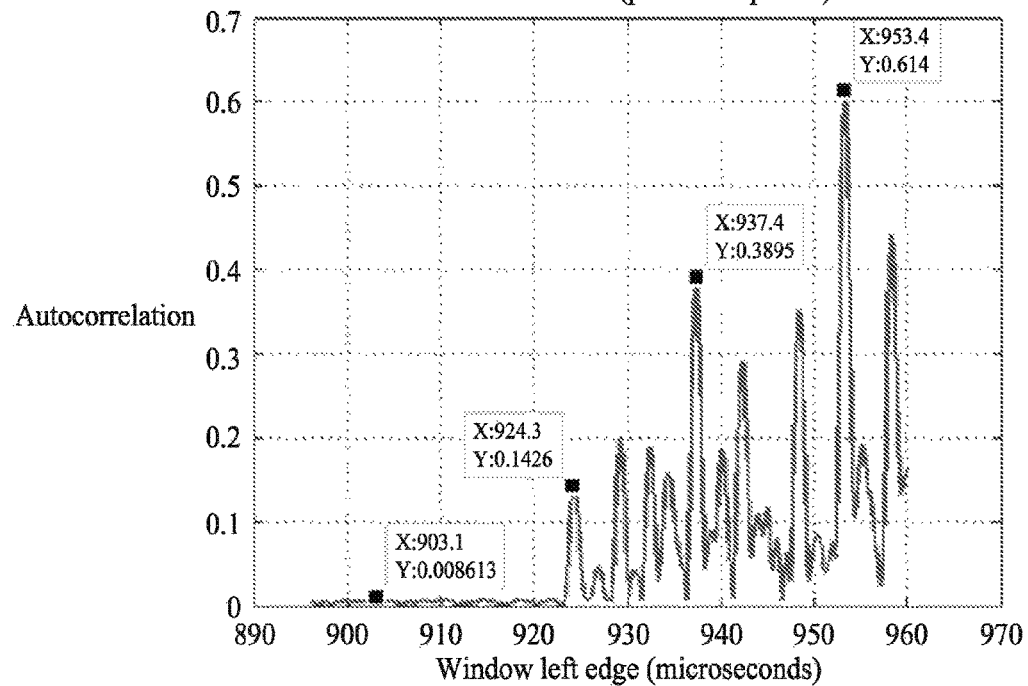

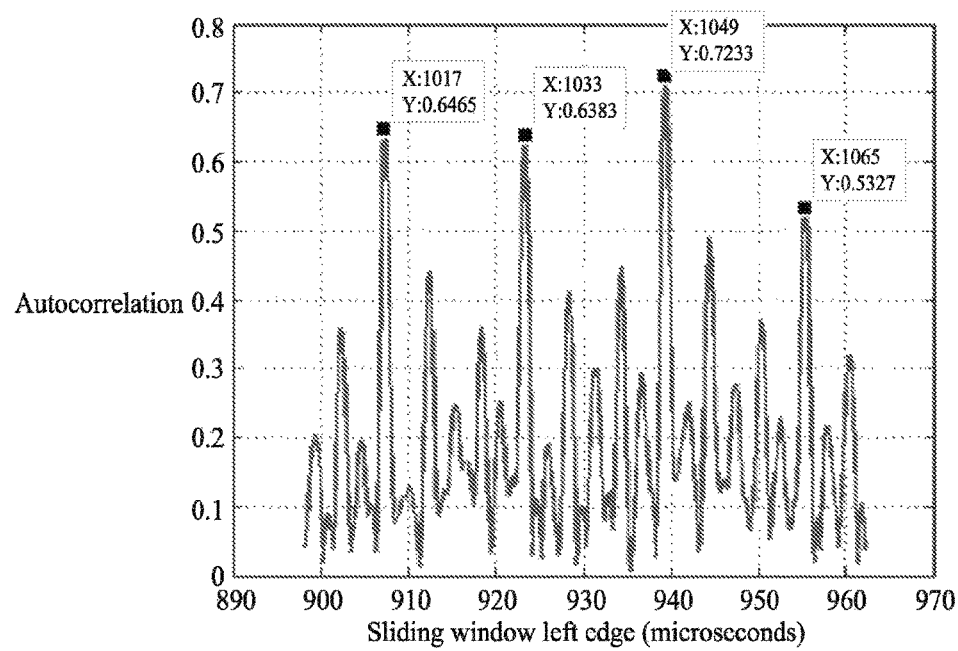

METHOD AND APPARATUS FOR DETECTING PACKET

CROSS-REFERENCE TO RELATED APPLICATION(S)

This application claims the benefit under 35 USC § 119(a) of Indian Patent Application No. 201641004229, filed on Feb. 5, 2016, in the Indian Patent Office, and Korean Patent Application No. 10-2016-0180204, filed on Dec. 27, 2016, in the Korean Intellectual Property Office, the entire disclosures of which are incorporated herein by reference for all purposes.

BACKGROUND

1. Field

The following description relates to a method and apparatus to detect an intended packet by a sliding intermediate frequency (SIF) coherent ultra low power (ULP) wireless receiver.

2. Description of Related Art

The ultra low power (ULP) wireless communication has gained traction with the advent of Internet of Things (IoT), wearables and e-Health applications. In general, a ULP transceiver has low data rates, for example, 1 Mbps, and operates over short distances, for example, sub 50 meters (m). Existing ULP transceivers achieve power consumption of 1 nanojoule per bit (nJ/bit), which has led to the evolution of wireless communication standards like IEEE 802.15.4q and Bluetooth Low Energy (BLE).

A radio frequency integrated circuit (RFIC) is a dominant power consuming block in ULP wireless communication. In order to extract maximum power savings from the RFIC, ternary amplitude shift keying (TASK) has been developed as a baseband (BB) modulation technique in the IEEE 802.15.4q standard. TASK not only provides inherent modulation duty cycling at a transmitter power amplifier, but also leads to relaxed requirements on RFIC components, such as a frequency synthesizer and a phase locked loop (PLL).

IEEE 802.15.4q compliant ULP chipsets are expected to be deployed in e-Health and sensor applications, where the traffic is sparse and has a low duty cycle. However, the duration of noise interval preceding an IEEE 802.15.4q physical (PHY) layer packet may be quite long. Thus, it is important to design an energy detection (ED) processor configured to define or to provide a transition from a noise period to a signal period with high reliability. Further, the ULP chipsets operate in an unlicensed 2.4 gigahertz (GHz) industrial scientific medical (ISM) band, coexisting with wireless local area network (WLAN) devices, Bluetooth (BT), and Bluetooth Low Energy (BLE) devices. It is imperative to design a packet detection (PD) method that may reliably distinguish between IEEE 802.15.4q PHY packets and other PHY packets in the ISM band.

Carrier frequency offset (CFO) is a radio frequency (RF) impairment that arises due to a slight mismatch between a local oscillator (LO) at the ULP receiver and an LO at the transmitter. The CFO may lead to improper symbol demodulation and erroneous decisions in a bit decoding process. Hence, it is important to estimate a CFO and design a CFO compensation processor, even for low signal-to-noise ratio (SNR) regimes.

Automatic gain control (AGC) is a crucial feature of the ULP receivers to accommodate a wide dynamic range of received power levels. In absence of AGC, a total gain is fixed. This leads to either saturation effects or a low signal-to-noise ratio (SNR) at outputs of an analog-to-digital converter (ADC). In either case, a signal is not demodulated properly. Moreover, the performance of AGC may be affected by Direct current offset (DCO).

DCO is a problem in sliding intermediate frequency (SIF) ULP receivers when gains of BB stages are high. Even small magnitudes of DCO may be significantly amplified due to high gains.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with some embodiments, a mechanism is described for reliable detection of an intended packet by a sliding intermediate frequency (SIF) coherent ultra low power (ULP) wireless receiver.

In accordance with some embodiments, a mechanism is described to detect a transition from a noise period to a signal period.

In accordance with some embodiments, a mechanism is described to dynamically adjust a gain of a pair of input sequences when the signal period is initiated.

In accordance with an embodiment, there is provided a method to detect a packet, the method including: detecting a transition from a noise period to a signal period in a pair of input sequences received; dynamically adjusting a gain of the pair of input sequences in response to the signal period being initiated; distinguishing an intended packet from packets received based on preambles included in the pair of input sequences; and compensating for a carrier frequency offset of the intended packet in the signal period.

The pair of input sequences may include an in-phase input sequence and a quadrature phase input sequence.

The compensating may include estimating the carrier frequency offset in the signal period.

Unknown offset voltage values of the pair of input sequences may be dynamically compensated for in the signal period prior to distinguishing the intended packet from the packets.

The distinguishing may include: computing a first peak autocorrelation value of an autocorrelation function in the noise period; computing a second peak autocorrelation value of the autocorrelation function in the signal period; determining whether a ratio of the second peak autocorrelation value to the first peak autocorrelation value exceeds a ratio; and obtaining peak times of the autocorrelation function in successive sub-intervals present in two consecutive preambles of the signal period.

The distinguishing further may include: determining whether a pair of peak times may be separated by a duration of a preamble having a jitter tolerance; identifying outliers in the peak times; and obtaining sanitized peak times by rejecting at most one outlier in the peak times.

The distinguishing further may include: determining whether a ratio of a maximum peak autocorrelation value to a minimum peak autocorrelation value from the sanitized peak times is less than a threshold value; determining whether each pair of successive sanitized peak times may be separated by a fraction of a duration of a preamble having an error tolerance; and distinguishing the intended packet from the packets in response to determining that each pair of successive sanitized peak times may be separated by the fraction of the duration of the preamble having the error tolerance.

The detecting may include: computing total variances of the pair of input sequences over time windows of an equal duration in the noise period and the signal period; computing a relative variance value by computing a difference between each total variance of each of the time windows and a reference value; and determining whether the relative variance value exceeds a threshold for a number of consecutive time windows.

The detecting may include: dynamically compensating for unknown offset voltage values of the pair of input sequences in the noise period; and computing a first peak autocorrelation value of an autocorrelation function in the noise period.

The intended packet may be an IEEE 802.15.4q physical layer packet.

A non-transitory computer-readable storage medium storing instructions that, when executed by a processor, cause the processor to perform the method described above.

In accordance with an embodiment, there is provided an ultra low power (ULP) wireless receiver, including: ultra low power (ULP) wireless receiver, including: a processor configured to detect a transition from a noise period to a signal period in a pair of input sequences received, dynamically adjust a gain of the pair of input sequences in response to the signal period being initiated, distinguish an intended packet from packets received based on preambles included in the pair of input sequences, and compensate for a carrier frequency offset of the intended packet in the signal period.

The processor may include: an energy detector configured to detect the transition from the noise period to the signal period in the pair of input sequences received, an automatic gain controller configured to dynamically adjust the gain of the pair of input sequences in response to the signal period being initiated, a packet detector configured to distinguish the intended packet from the packets received based on the preambles included in the pair of input sequences, and a carrier frequency offset compensator configured to compensate for the carrier frequency offset of the intended packet in the signal period.

The pair of input sequences may include an in-phase input sequence and a quadrature phase input sequence.

The ULP wireless receiver may further include: a carrier frequency offset estimator configured to estimate the carrier frequency offset in the signal period.

The ULP wireless receiver may further include: a direct current offset compensator configured to dynamically compensate for unknown offset voltage values of the pair of input sequences in the signal period prior to distinguishing the intended packet from the packets.

The packet detector may be configured to: compute a first peak autocorrelation value of an autocorrelation function in the noise period, compute a second peak autocorrelation value of the autocorrelation function in the signal period, determine whether a ratio of the second peak autocorrelation value to the first peak autocorrelation value exceeds a ratio, and obtain peak times of the autocorrelation function in successive sub-intervals present in two consecutive preambles of the signal period.

The packet detector may be configured to: determine whether a pair of peak times may be separated by a duration of a preamble having a jitter tolerance, identify outliers in the peak times, and obtain sanitized peak times by rejecting at most one outlier in the peak times.

The packet detector may be configured to: determine whether a ratio of a maximum peak autocorrelation value to a minimum peak autocorrelation value from the sanitized peak times is less than a threshold value, determine whether each pair of successive sanitized peak times may be separated by a fraction of a duration of a preamble having an error tolerance, and distinguish the intended packet from the packets in response to determining that each pair of successive sanitized peak times may be separated by the fraction of the duration of the preamble having the error tolerance.

The energy detector may be configured to: compute total variances of the pair of input sequences over time windows of an equal duration in the noise period and the signal period, compute a relative variance value by computing a difference between each total variance of each of the time windows and a reference value, and determine whether the relative variance value exceeds a threshold for a number of consecutive time windows.

The energy detector may be configured to: dynamically compensate for unknown offset voltage values of the pair of input sequences in the noise period, and compute a first peak autocorrelation value of an autocorrelation function in the noise period.

The intended packet may be an IEEE 802.15.4q physical layer packet.

Other features and aspects will be apparent from the following detailed description, the drawings, and the claims.

BRIEF DESCRIPTION OF THE DRAWINGS

FIG. 6B is a flowchart illustrating an example of a method of sequencing various components to distinguish an intended packet from a plurality of packets, in accordance with an embodiment.

FIG. 6C is a flowchart illustrating an example of a method of sequencing various components to distinguish an intended packet from a plurality of packets, in accordance with an embodiment.

FIG. 6D is a flowchart illustrating an example of a method of sequencing various components to distinguish an intended packet from a plurality of packets, in accordance with an embodiment.

FIGS. 8A, 8B and 8C are graphs illustrating examples of energy detection (ED) during a noise period and a post noise period.

FIGS. 8D, 8E, 8F, 8G, and 8H are graphs illustrating examples of packet detection (PD) during a noise period and a post noise period.

Figure 1:
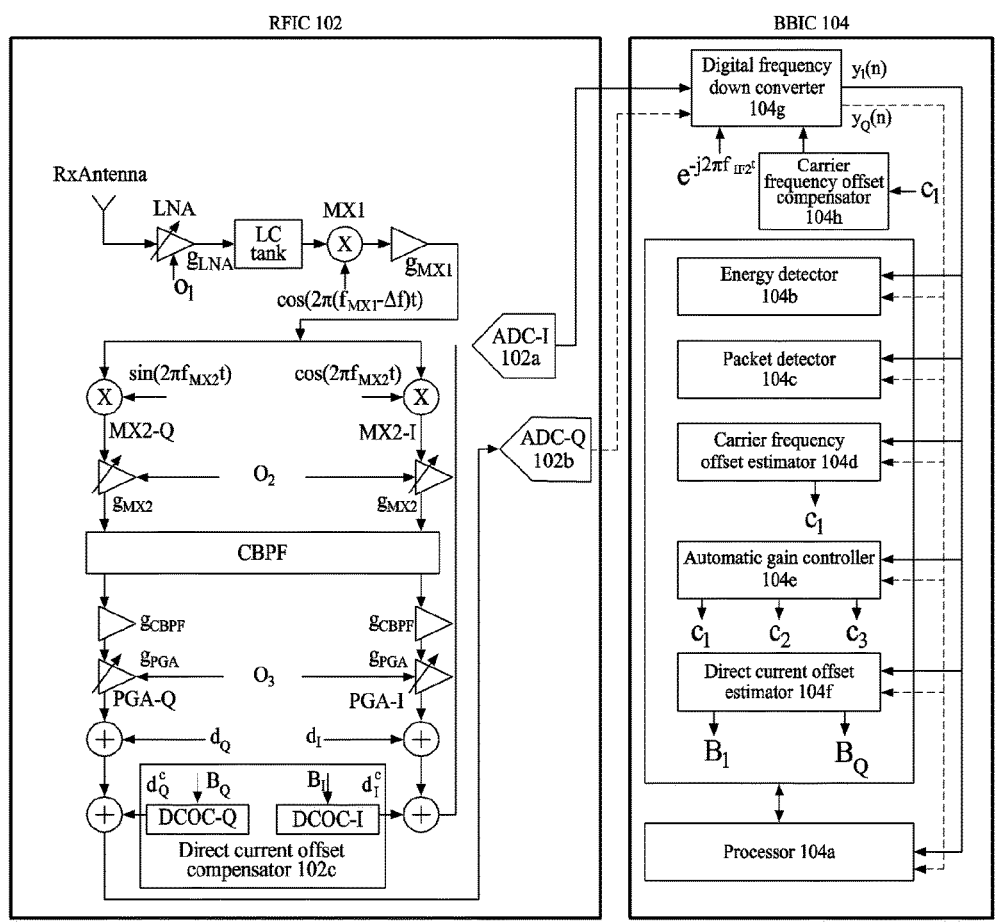
FIG. 1 is a block diagram illustrating an example of a sliding intermediate frequency (SIF) coherent ultra low power (ULP) wireless receiver, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Various alterations and modifications may be made to the examples. Here, the examples are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, reference will now be made in detail to examples with reference to the accompanying drawings, wherein like reference numerals refer to like elements throughout.

The embodiments herein achieve a method and an apparatus to reliably detect an intended data packet by a sliding intermediate frequency (SIF) coherent ultra low power (ULP) wireless receiver.

The embodiments may be used in ULP receivers to reduce battery power consumption by turning on a baseband demodulation and decoding circuitry in a baseband integrated circuit (BBIC) during a presence of an 802.15.4q PHY signal. Further, in the embodiments, energy detection (ED) is reliably performed to ascertain a transition from a noise period to a signal period. Furthermore, a packet detector in the BBIC is triggered based on detected energy in order to distinguish between the intended packet (for example, an IEEE 802.15.4q physical layer packet) and other physical layer packets in an unlicensed 2.4 gigahertz (GHz) industrial scientific medical (ISM) band.

The embodiments utilize automatic gain control (AGC) technique by which gains in a radio frequency integrated circuit (RFIC) are set to values which are appropriate to successfully demodulate a signal in the BBIC. Further, the embodiments employ a direct current offset compensation (DCOC) technique that compensates for various and random direct current offsets (DCOs) across in-phase and quadrature rails at a back-end of the RFIC. The efficient DCOC ensures that there are no errors in the baseband demodulation.

The embodiments provide a mechanism for integration of ED, data packet detection (PD), AGC and DCOC techniques as an "outer receiver system" in the SIF coherent receiver that processes IEEE 802.15.4q physical layer packets.

The embodiments provide a mechanism of coherent PD for a preamble portion of an IEEE 802.15.4q physical layer packet. The proposed PD method exploits repetition properties of a 16-chip sub-preamble based on autocorrelation and leverages the fact that a ratio of a peak value to an average value is very high. Additionally, the PD method involves various determinations or checks (such as a coarse check, an outlier check, and a fine check) before declaring the intended packet as the 802.15.4q physical layer packet. The embodiments may be used to reduce a number of false detections during the noise period and at a noise-to-signal boundary. Further, the example embodiments may be used to distinguish between the intended packet (for example, the IEEE 802.15.4q physical layer packet) and other packets (for example, WLAN/BT/BLE physical layer packets). Further, the examples may be used for CFO estimation in the signal period and compensation of CFO estimation in the signal period in order to extract a reconstructed signal (which is error free) at the receiver.

Throughout the disclosure, the terms "signal period" and "post noise period" will have the same meaning.

FIG. 1 is a block diagram illustrating an example of an SIF coherent ULP wireless receiver 100, in accordance with an embodiment.

Referring to FIG. 1, an incoming air signal with an amplitude A is detected by a receiver (Rx) antenna. The air signal with the amplitude A is represented as $r(t)=A \cos(2\pi f_{RF}t)+w(t)$. Here, $f_{RF}$ is a signal center frequency, and w(t) is white Gaussian noise (WGN) with a power spectral density (PSD) of −174 decibel-milliwatts per hertz (dBm/Hz). A signal is amplified by a low noise amplifier (LNA).

After amplified by the LNA, the signal impinges a mixer-1 (MX1), where the signal is multiplied by a tone $\cos(2\pi f_{MX1}t)$. Here, $f_{MX1}$ denotes a beating frequency of the mixer-1. This operation results in signal energy having a frequency translated to $(f_{RF}+f_{MX1})$ and $f_{RF}-f_{MX1}=f_{IF1}$. Here, $f_{IF1}$ denotes a first intermediate frequency (IF). A higher frequency component is rejected by a complex band pass filter (CBPF). An unknown value of CFO Δf is introduced at the mixer-1. After the gain of the mixer-1, the signal is processed in a quadrature manner (for example, along I and Q rails) up to two analog-to-digital converters (ADCs) (including an ADC-I 102a and an ADC-Q 102b).

A mixer-2 (MX2) down-converts an output signal of the mixer-1 to a second IF $f_{IF2}$ for "near baseband" filtering. Particularly, the output signal of the mixer-1 is multiplied by $\cos(2\pi f_{MX2}t)$ on an I-arm, and multiplied by $\sin(2\pi f_{MX2}t)$ on a Q-arm. Here, $f_{MX2}$ denotes a beating frequency of the mixer-2. The near baseband filtering yields cross-modulation products at frequencies $f_{IF1}+f_{MX2}$ and $f_{IF1}-f_{MX2}=f_{IF2}$. The higher frequency component is rejected by the CBPF in a receiver signal path. I and Q outputs of the mixer-2 are amplified by the same value of a gain of the mixer-2. The amplified I and Q outputs of the mixer-2 are fed to I and Q inputs of the CBPF. Here, out-of-band signal components are rejected at $f_{RF}+f_{MX1}$ and $f_{IF1}+f_{MX2}$. A center frequency of the CBPF $f_{IF2}$ is tuned to 2.3 megahertz (MHz). The CBPF has a fixed gain on each of the I-arm and the Q-arm.

Post filtering, for example, the I and Q signals, are scaled by a programmable gain amplifier (PGA). In this example, the same value of a gain of the PGA is applied to both, the I-arm and the Q-arm. Outputs of PGAs are corrupted by unknown DCO values. Specifically, a random DCO voltage $d_I$ is added to an analog output of a PGA on the I-arm. Also, a random DCO voltage $d_Q$ is added to an analog output of the PGA on the Q-arm. Corresponding compensation voltages $d_I^c$ and $d_Q^c$ are added to these signals prior to being fed to each of the ADC-I 102a and the ADC-Q 102b.

The ADC-I 102a and the ADC-Q 102b are 8-bit coherent ADCs with a sampling rate $F_{samp}$=3 Msps. Outputs of the ADCs, for example, the ADC-I 102a and the ADC-Q 102b, are restricted to the range [−500, 500] millivolts (mV). As depicted in FIG. 1, the outputs of the ADC-I 102a and the ADC-Q 102b are processed by digital logic blocks in the BBIC 104.

TABLE 1

| Description | Symbol | Set of value(s) in dB |
|---|---|---|
| LNA gain | $g_{LNA}$ | {−3, 9, 21} |
| Mixer-1 gain | $g_{MX1}$ | 21.5 |
| Mixer-2 gain | $g_{MX2}$ | {0, 12} |
| CBPF gain | $g_{CBPF}$ | 8 |
| PGA gain | $g_{PGA}$ | 0:0.75:37.5 |

Table 1 shows permissible gain values of all components in the RFIC 102. The gain of the PGA has any value from 0 decibels (dB) to 37.5 dB in steps of, for example, 0.75 dB. An automatic gain controller 104e controls and varies the gains of the LNA, the mixer-2, and the PGA. On the other hand, the gains of the mixer-1 and the CBPF are constant, with a total value $g_{constant}=g_{MX1}+g_{CBPF}=29.5$ dB.

As depicted in FIG. 1, the CBPF fits into the RFIC 102. After the stage of the mixer-2, a desired signal is present at $f_{IF2}$ while an undesired signal is present at $f_{IF1}+f_{MX2}$. The configuration of the CBPF is made such that it not only passes the desired signal, but also attenuates an image signal by a sufficient margin. A general process to configure the CBPF is:

Consider a real low pass filter (LPF) $F_1$ whose frequency response is $H_1(s)$; and Create a Hilbert filter $F_2$, by translating the LPF $F_1$ with a shift transform $s \rightarrow s+j\omega_0$, where $\omega_0=2\pi f_{IF2}$. Note that a frequency response of $F_2$ is not symmetric around a zero frequency ω=0. A shift value of $\omega_0$ is chosen in such a way that a desired frequency (for example, $f_{IF2}$) lies in a pass-band while an undesired or image frequency $-f_{IF2}$ lies in a stop band.

An ADC samples as well as quantizes an incoming analog signal. The RFIC 102 of FIG. 1 employs 8-bit ADCs. Each ADC may have the following features.

a. Within the ADC, the signal is restricted to the range [−500, 500] mV. In particular, any voltage exceeding 500 mV is clamped down to 500 mV. Moreover, any voltage less than −500 mV is saturated to −500 mV.

b. Resolution of every ADC is 8 bits. Equivalently, an output of the ADC may be interpreted, construed, or translated as an 8-bit signed integer. For example, "00000000" represents 0 mV, "11111111" represents 0.498 mV, and "10000000" represents −500 mV.

c. An input of each ADC is uniformly quantized to 256 levels at an output.

d. The automatic gain controller 104e, a carrier frequency offset estimator 104d, a packet detector 104c, an energy detector 104b, and a direct current offset estimator 104f interpret the outputs of the ADC-I 102a and the ADC-Q 102b as discrete voltages (complex numbers) with an amplitude resolution of 3.906 mV.

A digital frequency down converter 104g is used to down convert the sampled signal from a second intermediate frequency $f_{IF2}$ to a baseband (0 Hz). This is achieved by multiplying the incoming signal by a phasor $$e^{-j2\pi f_{IF2}t} = e^{-j2\pi f_{IF2}nT_s}.$$

Here, n denotes a sample index, and $T_s$ denotes a sampling period.

The processor 104a receives a pair of input sequences that include the output samples of the ADC-I 102a and the ADC-Q 102b from the RFIC 102 of the SIF coherent ULP receiver 100. For example, the pair of input sequences includes a plurality of preambles and data. The processor 104a controls the other components or facilitates communication among the other components present in the BBIC 104.

The energy detector 104b detects a transition from the noise period to the signal period in the pair of input sequences.

The energy detector 104b computes total variances of the pair of input sequences over time windows of an equal duration (for example, eight microseconds (μs)) in the noise period. Further, the energy detector 104b computes a relative variance value by computing a difference between each total variance of each time window and a reference value. Furthermore, the energy detector 104b determines whether the relative variance value exceeds a predetermined threshold for a predetermined number of consecutive time windows. The computations performed by the energy detector 104b will be described in graphs shown in FIGS. 8A through 8C.

The automatic gain controller 104e dynamically or automatically, without user intervention, and periodic or continuous adjusts a gain of the pair of input sequences when the signal period is initiated. The automatic gain controller 104e determines and iteratively changes values of the gains of the LNA, the mixer-2, and the PGA to ensure that output signals of the ADC-I 102a and the ADC-Q 102b have sufficient signal-to-noise ratios (SNRs) for BB demodulation. For example, the noise refers to cumulative effects of thermal Gaussian noise, non-linear noise, and quantization noise (due to a finite resolution of the ADC-I 102a and the ADC-Q 102b).

The processor 104a triggers the packet detector 104c after the automatic gain controller 104e adjusts the gain of the pair of input sequences.

The packet detector 104c distinguishes an intended packet from a plurality of packets received based on the plurality of preambles received. For example, the intended packet is an IEEE 802.15.4q physical layer packet.

The packet detector 104c performs one or more checks or validations during the signal period to detect the intended packet from the plurality of packets. The various checks or validations performed by the packet detector 104c will be described with reference to FIG. 6.

The carrier frequency offset estimator 104d accepts I-arm and Q-arm digital output samples $y_I(n)$ and $y_Q(n)$ of the digital frequency down converter 104g as inputs, and estimates the unknown CFO using a sequence of operations. A carrier frequency offset compensator 104h in the BBIC 104 uses the output $C_1$ as depicted in FIG. 1 to compensate for the CFO. In one example, the carrier frequency offset estimator 104d estimates CFO in the range [−250, +250] kHz, which includes three stages: block detection, CFO coarse estimation, and CFO fine estimation.

The block detection stage provides a time reference for the CFO estimation. The CFO coarse estimation identifies a period of T=2 μs within a preamble $x_p$ of duration 32 μs to estimate CFO in the range [−250, +250] kHz. A coarse estimate is obtained as $$\delta f = \frac{-\angle\{y(t)y^*(t-T)\}}{2\pi T}$$

from a received signal y(t).

The CFO estimation requires sufficient averaging to combat effects of noise, especially in low SNR regimes. Ideally, the CFO reliably is estimated within 2 repetitions of a preamble 64 μs leaving remaining repetitions for other algorithms. Therefore, there is the additional operation of CFO fine estimation which is intended to improve the reliability of the CFO coarse estimate previously obtained. The CFO fine estimation refines the CFO coarse estimate to a better accuracy as discussed in the following.

The CFO estimation presented earlier obtains an angle $\varphi_2$, which is an angle between two samples that are located 2 μs apart or equivalently two preamble chips apart.

FIGS. 2A through 2D illustrate examples of input/output signals of the components of FIG. 1.

Figure 2A:
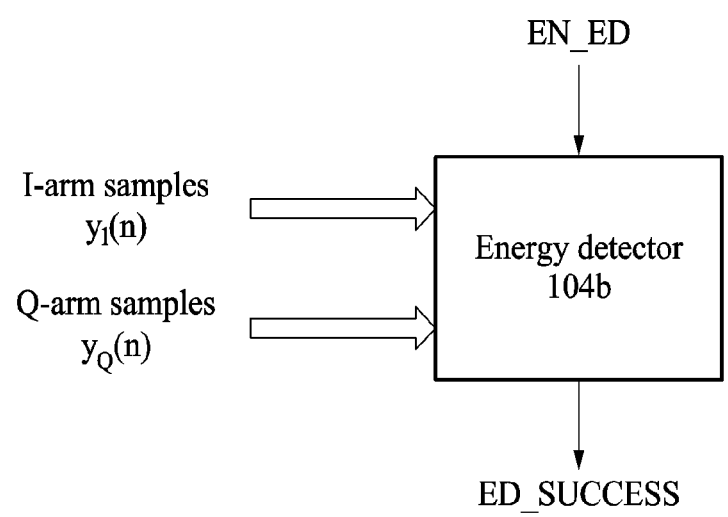
FIGS. 2A, 2B, 2C, 2D and 2E illustrate examples of input/output signals of components of FIG. 1.

Referring to FIG. 2A, the energy detector 104b is turned ON when an input control signal EN_ED is high (at a high level, for example, for logic "1"). When the input control signal EN_ED is low (at a low level, for example, for logic "0"), the energy detector 104b is deactivated (for example, in an idle or low power state). When the energy detector 104b detects signal energy, an output control signal ED_SUCCESS is high (at a high level), indicating that the processor 104a has triggered the automatic gain controller 104e. Otherwise, a default state of the output control signal ED_SUCCESS is low (at a low level).

Figure 2B:
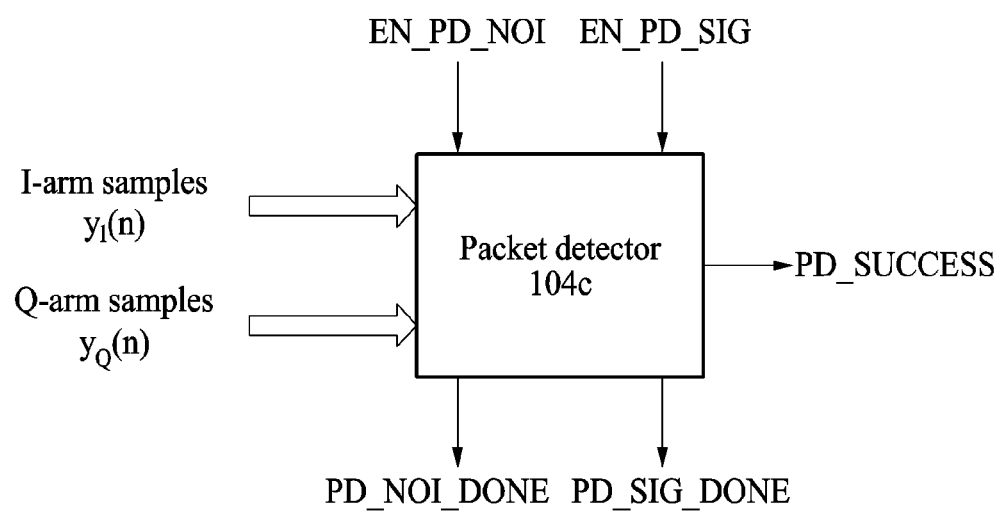

Referring to FIG. 2B, the packet detector 104c is triggered when an input control signal EN_PD_NOI or an input control signal EN_PD_SIG is high. These input control signals correspond to stages of detection of the intended packet in the "noise period" and the "post noise period", respectively. Output control signals of the packet detector 104c are PD_NOI_DONE, PD_SIG_DONE and PD_SUCCESS. Depending on the stage and result of detection of the intended packet, one or more of these signals (for example, PD_NOI_DONE, PD_SIG_DONE and PD_SUCCESS) are turned high.

After completion of the noise period, the output control signal PD_NOI_DONE is always high. After the post-noise period, the output control signal PD_SIG_DONE is always high. In the event that the packet detector 104c has detected an IEEE 802.15.4q PHY signal in the post noise period, the output control signal PD_SUCCESS changes to high. Default values of the output control signals PD_NOI_DONE, PD_SIG_DONE and PD_SUCCESS are low (for example, logic "0").

Figure 2C:
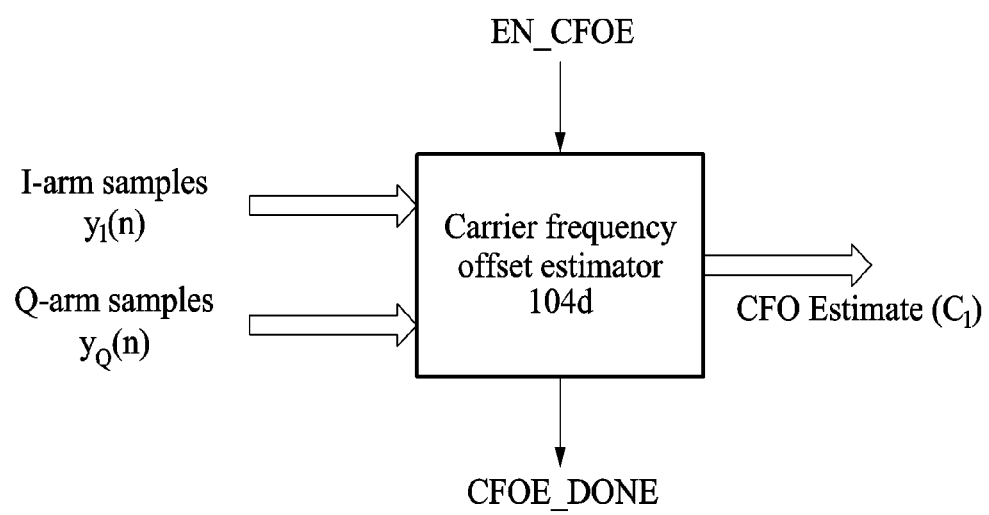

Referring to FIG. 2C, the carrier frequency offset estimator 104d is triggered when an input control signal EN_CFOE from the processor 104a is high. An output data signal from the carrier frequency offset estimator 104d is a 9-bit line $C_1$, that is used to select 1 out of 512 values of a CFO estimate $\Delta\hat{f}$. The CFO estimate is in the range [−250, 250] kHz with a resolution of about 1 kHz. An output control signal of the carrier frequency offset estimator 104d is CFOE_DONE. A default value of the output control signal CFOE_DONE is low. After the carrier frequency offset estimator 104d completes its function, in a signal period, the output control signal CFOE_DONE goes high, which is received at the processor 104a to trigger a timing synchronizer.

Figure 2D:
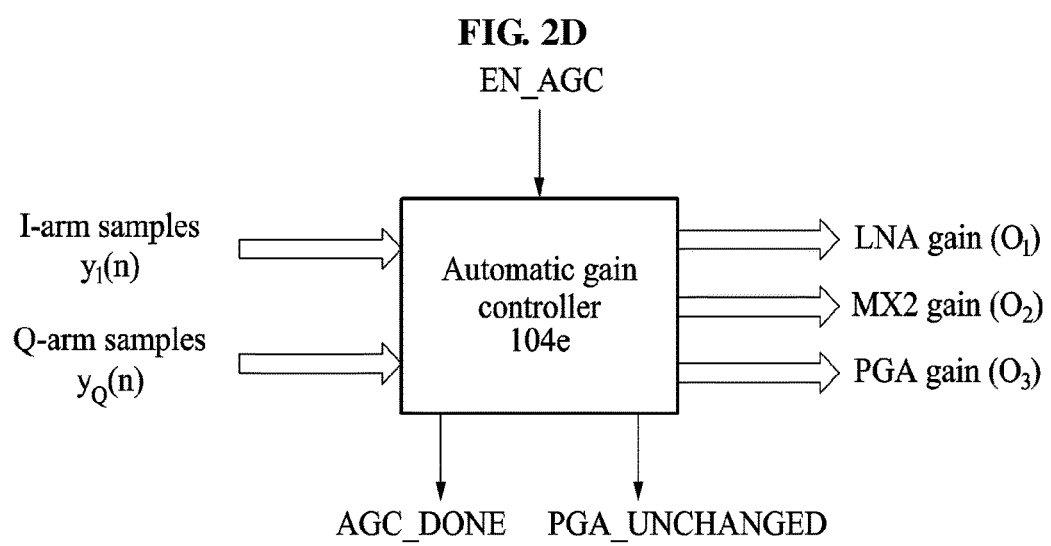

Referring to FIG. 2D, the automatic gain controller 104e is triggered when an input control signal EN_AGC from the processor 104a is high. As depicted in FIG. 2D, output data signals from the automatic gain controller 104e include:

a. 2-bit line $O_1$, to select 1 out of 3 values of LNA gain $g_{LNA}$;
b. 1-bit line $O_2$, to select 1 out of 2 values of mixer-2 gain $g_{MX2}$; and
c. 6-bit line $O_3$, to select 1 out of 51 values of PGA gain $g_{PGA}$.

The output data signals O1, O2 and O3 are interfaced with the RFIC 102. The output control signals from the automatic gain controller 104e are AGC_DONE and PGA_UN-CHANGED. A default value of the output control signal AGC_DONE is low. The output control signal AGC_DONE is high after adjusting the gain of the pair of input sequences. The output control signal AGC_DONE being high is an indication to the processor 104a or enables the processor 104a to trigger the packet detector 104c or the direct current offset estimator 104f, depending on initial conditions (for example, BB register settings) of the SIF coherent ULP wireless receiver 100. A default value of the output control signal PGA_UNCHANGED is low. In an example in which there is no change in the gain of the PGA after the completion of AGC algorithm, the output control signal PGA_UN-CHANGED is set high.

Figure 2E:
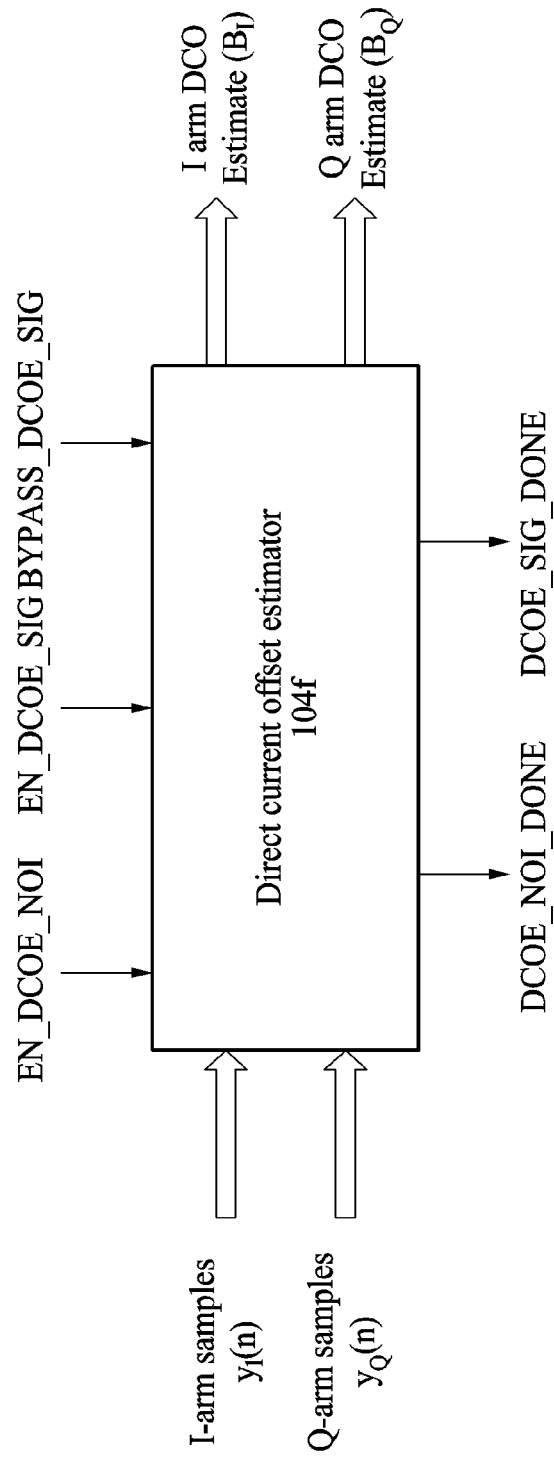

Referring to FIG. 2E, the direct current offset estimator 104f is triggered when any of input control signals EN_D-COE_NOI, EN_DCOE_SIG or BYPASS_DCOE_SIG is high. The first two control signals (for example, EN_D-COE_NOI and EN_DCOE_SIG) correspond to "noise period" and "signal period" stages of the direct current offset estimator 104f. The third control signal (for example, BYPASS_DCOE_SIG) indicates that the direct current offset estimator 104f is not required during the signal period. The output data signals from the direct current offset estimator 104f include:

a. 8-bit line $B_I$, to select 1 out of 256 values of I-arm DCOE $\hat{d}_I$; and
b. 8-bit line $B_Q$, to select 1 out of 256 values of Q-arm DCOE $\hat{d}_Q$;

The output control signals of the direct current offset estimator 104f are DCOE_NOI_DONE and DCOE_SIG_DONE. Depending on the stage of the direct current offset estimator 104f, one of these signals is tuned high. After the direct current offset estimator 104f is completed during the noise period, the output control signal DCOE_NOI_DONE turns high. After the direct current offset estimator 104f is completed during the signal period, the output control signal DCOE_SIG_DONE turns high. Default values of the output control signals DCOE_NOI_DONE and DCOE_SIG_DONE are low.

Figure 3A:
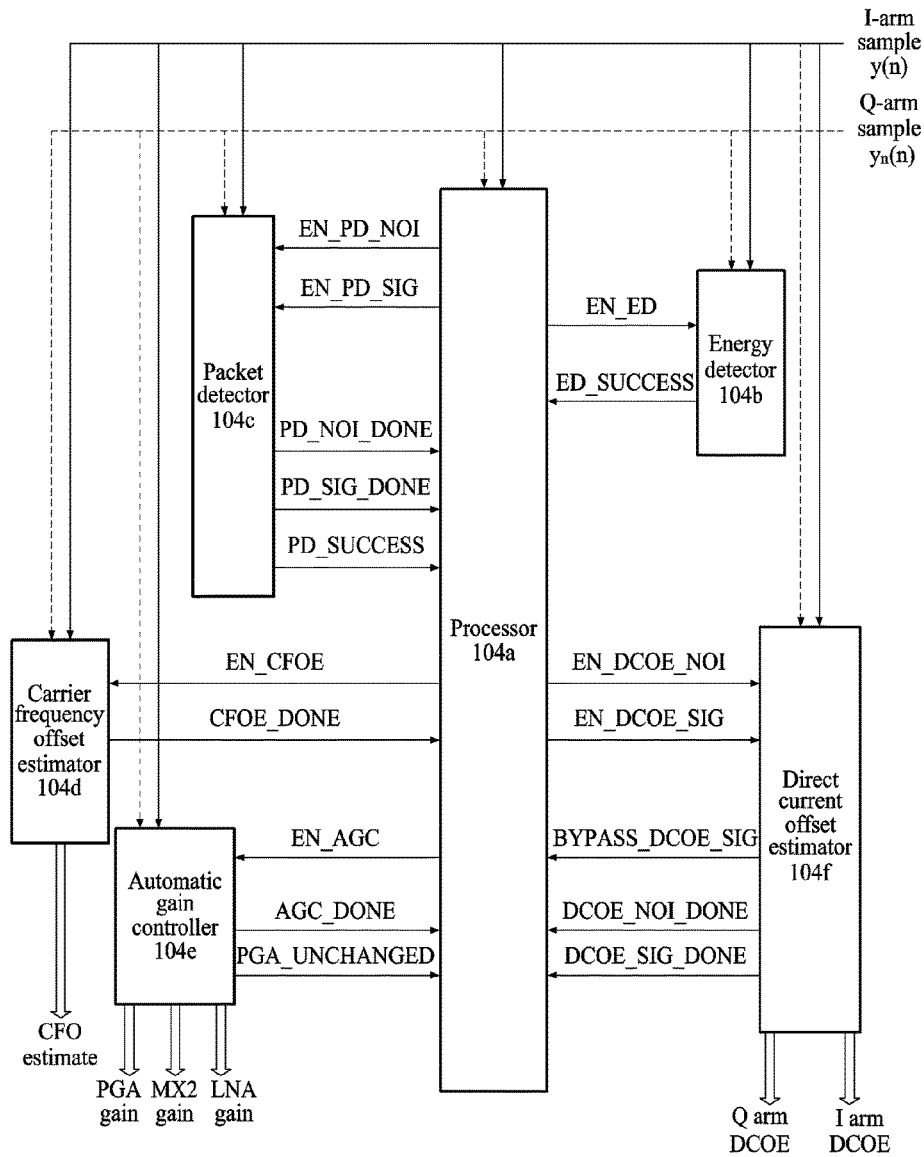
FIG. 3A illustrates an example of interconnection signaling between the various components of FIG. 1.

FIG. 3A illustrates an example of interconnection signaling between the various components of FIG. 1.

Interconnection between the energy detector 104b, the carrier frequency offset estimator 104d, the packet detector 104c, the automatic gain controller 104e, and the direct current offset estimator 104f in the SIF coherent ULP receiver 100 is shown in FIG. 3A. In FIG. 3A, the processor 104a triggers the packet detector 104c (through the control signal EN_PD_NOI) or the direct current offset estimator 104f (through the control signal EN_DCOE_NOI) based on the values stored in BB registers.

Table 2 shows time budgets of the outer receiver components in the SIF coherent receiver 100 during the noise period and the signal period.

| Outer receiver block | Stage | Time budget (microseconds) |
| --- | --- | --- |
| Energy detector | Noise | Indefinite |
| | Post noise/signal | 24 |
| Packet detector | Noise | 96 |
| | Post noise/signal | 96 |
| Automatic gain controller | Post noise/signal | 32 |
| Direct current offset estimator | Noise | 8 |
| | Signal | 16 |
| Carrier frequency offset estimator | Signal | 64 |

Figure 3B:
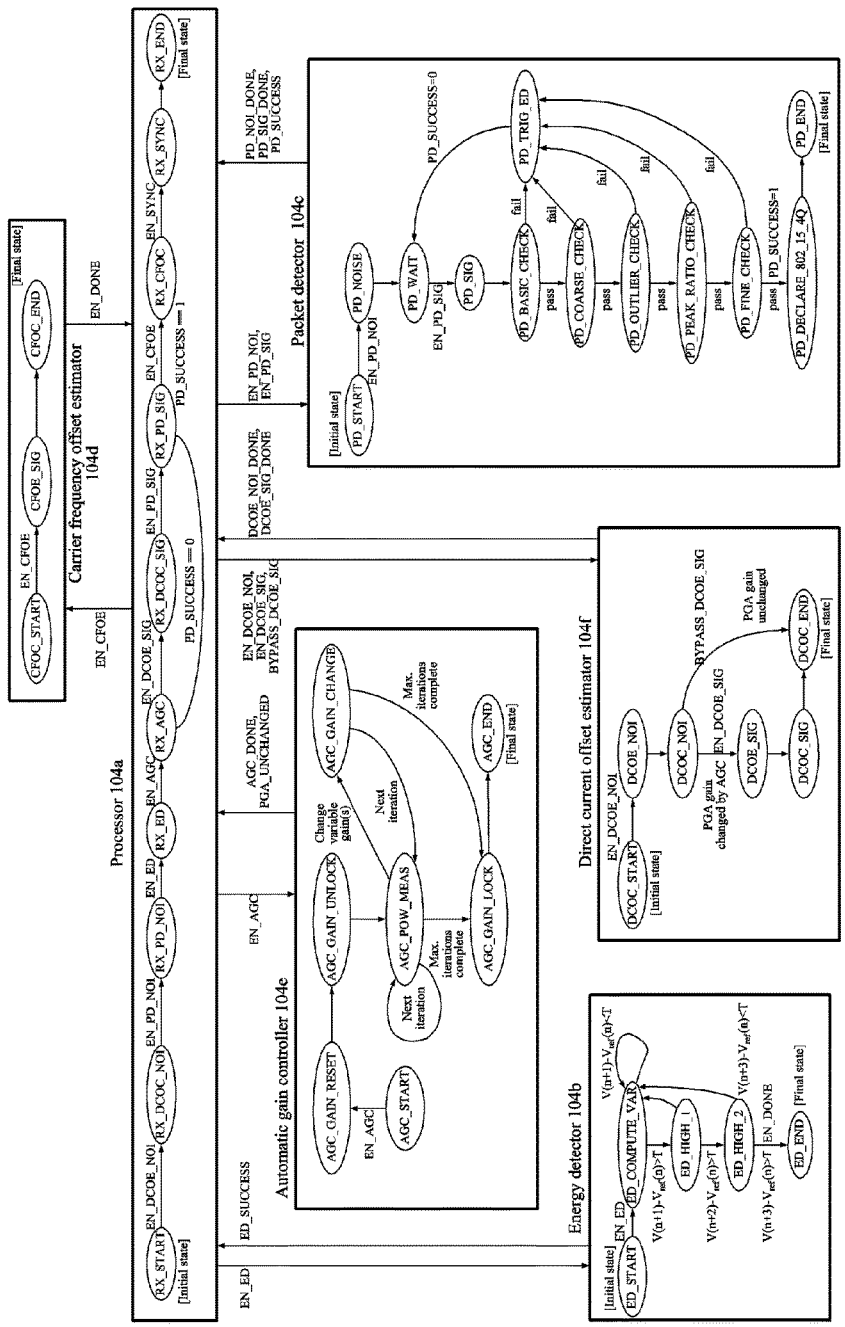
FIG. 3B illustrates an example of a finite state machine (FSM) representation of the components of FIG. 1.

FIG. 3B illustrates an example of a finite state machine (FSM) of the components of FIG. 1.

An FSM of the energy detector 104b is as depicted in FIG. 3B. An initial state of the energy detector 104b is ED_START. When triggered by the processor 104a through a control signal EN_ED, the energy detector 104b transitions to a state ED_COMPUTE_VAR to compute total variances of samples of the ADC_I 102a and the ADC-Q 102b across successive time windows. Let V(k) denote a total variance of samples of the ADC_I 102a and the ADC-Q 102b for a time window $k^{th}$. In this state, the energy detector 104b computes a value V(k+1) and updates a value $V_{ref}(k)$ for time windows $(k+1)^{th}$ and $k^{th}$, respectively. If V(k+1)−$V_{ref}(k)$<T (T denoting an ED threshold), the energy detector 104b returns to the same state ED_COMPUTE_VAR. Otherwise, if V(k+1)−$V_{ref}(k)$≥T, the energy detector 104b transitions to a state ED_HIGH_1. In this state, the energy detector 104b computes a value V(k+2). If V(k+2)−$V_{ref}(k)$≥T, the energy detector 104b transitions to a state ED_HIGH_2. Otherwise, the energy detector 104b transitions to the state ED_COMPUTE_VAR. In the state ED_HIGH_2, the energy detector 104b checks whether V(k+3)−$V_{ref}(k)$≥T. If this condition is false in the state ED_HIGH_2, the energy detector 104b returns to the state ED_COMPUTE_VAR. If this condition is true in the state ED_HIGH_2, the energy detector 104b transitions to a state ED_END. In this state ED_END, the energy detector 104b sets an output control signal ED_SUC-CESS to be high. In this example, a sojourn time in each state by the energy detector 104b is 8 μs (for example, a duration of variance measurement window).

An FSM of the packet detector 104c is as shown in FIG. 3B. An initial state thereof is PD_START. When triggered by an input control signal EN_PD_NOI from the processor 104a, the packet detector 104c transitions to a state PD_NOISE. In this state PD_NOISE, the packet detector 104c computes a first peak autocorrelation value α during the noise period. Further, the packet detector 104c transitions to a state PD_WAIT. When triggered by an input control signal EN_PD_SIG from the processor 104a, the packet detector 104c transitions to a state PD_SIG. In this state PD_SIG, the packet detector 104c computes a second peak autocorrelation value β during the post-noise period. Further, the packet detector 104c transitions to a state PD_BASIC_CHECK and determines whether β/α≥2. If the packet detector 104c determines that β/α<2, the packet detector 104c transitions to a state PD_TRIG_ED. In this state PD_TRIG_ED, the output control signal PD_SIG_DONE is high as depicted in FIG. 3A, and the packet detector 104c returns to the state PD_WAIT. On the other hand, if a basic check passes, the packet detector 104c transitions from the state PD_BASIC_CHECK to a state PD_COARSE_CHECK. In this state, the packet detector 104c executes a coarse check. If the packet detector 104c clears the coarse check, the packet detector 104c transitions to a state PD_OUTLIER_CHECK and checks for outliers in a sequence of four peak times. If the outlier check is cleared, the packet detector 104c transitions to a state PD_PEAK_RATIO_CHECK. In this state, the packet detector 104c examines peak values corresponding to the sanitized sequence of peak times. Specifically, the packet detector 104c checks whether a ratio of a maximum peak value to a minimum peak value is less than a predetermined value. If the peak ratio check has passed or terminates, the packet detector 104c transitions to a state PD_FINE_CHECK and scrutinizes a sequence of sanitized peak times. If a fine check is cleared, the packet detector 104c transitions to a state PD_DECLARE_15_4Q. In this state PD_DECLARE_

15_4Q, the packet detector 104c activates the output control signal PD_SUCCESS to be high. Further, the packet detector 104c transitions to a final state PD_END. Finally, if any of the four previous checks (the coarse check, the outlier check, the peak ratio check, or the fine check) is not cleared, the packet detector 104c returns to the state PD_TRIG_ED, sets the output control signal PD_SIG_DONE to be high, and transitions to the state PD_WAIT.

An FSM of the automatic gain controller 104e is as shown in FIG. 3B. An initial state of the automatic gain controller 104e is AGC_START. When triggered by the processor 104a through an input control signal EN_AGC, the automatic gain controller 104e transitions to a state AGC_GAIN_RESET. In this state AGC_GAIN_RESET, the automatic gain controller 104e sets all variable gains to their highest values. Further, the automatic gain controller 104e transitions to a state AGC_GAIN_UNLOCK, which indicates that variable gains may be changed during the course of AGC. Further, the automatic gain controller 104e transitions to a state AGC_POW_MEAS for an average power computation during an 8-μs window. If the automatic gain controller 104e determines that variable gains have to be changed, the automatic gain controller 104e transitions to a state AGC_GAIN_CHANGE. In this state AGC_GAIN_CHANGE, the automatic gain controller 104e transmits output data signals O1, O2, and O3 to change the gains of the LNA, the mixer-2, and the PGA in the RFIC 102.

If another iteration of power measurement is required, the automatic gain controller 104e returns to the state AGC_POW_MEAS. On the other hand, if an AGC logic determines that all variable gains should remain unchanged and another power measurement iteration is due, the automatic gain controller 104e returns to the state AGC_POW_MEAS. If a maximum number of AGC iterations (for example, 4 AGC iterations) are completed, the automatic gain controller 104e transitions from the state AGC_POW_MEAS or AGC_GAIN_CHANGE to a state AGC_GAIN_LOCK. In this state AGC_GAIN_LOCK, the variable gains are locked and may not be changed thereafter. An output control signal AGC_DONE is set to be high (for example, logic "1"). Further, the automatic gain controller 104e transitions to a final state AGC_END.

An FSM of the direct current offset estimator 104f is as shown in FIG. 3B. An initial state of the direct current offset estimator 104f is DCOC_START. When triggered by an input control signal EN_DCOE_NOI received from the processor 104a, the direct current offset estimator 104f transitions to a state DCOE_NOI. In this state DCOE_NOI, the direct current offset estimator 104f estimates I-arm and Q-arm DCOs during the noise period. Further, the direct current offset estimator 104f transitions to a state DCOC_NOI. In this state DCOC_NOI, the direct current offset estimator 104f transmits output data signals $B_I$ and $B_Q$ to apply DCO compensation values $d_I^c$ and $d_Q^c$ in the RFIC 102.

When triggered by the processor 104a through an input control signal EN_DCOE_SIG, the direct current offset estimator 104f transitions to a state DCOE_SIG. The control signal EN_DCOE_SIG is high only when the gain of the PGA is varied by the automatic gain controller 104e. In the state DCOE_SIG, the direct current offset estimator 104f estimates I-arm and Q-arm DCOs during the signal period. Further, the direct current offset estimator 104f transitions to a state DCOC_SIG, to apply new DCO compensation voltages $d_I^c$ and $d_I^Q$ in the RFIC 102 (till the end of packet). Further, the direct current offset estimator 104f sets an output control signal DCOE_SIG_DONE to be high, and transitions to a final state DCOC_END.

In the state DCOC_NOI, when the automatic gain controller 104e does not vary the gain of the PGA, an input control signal BYPASS_DCOE_SIG turns high. In such a scenario, the direct current offset estimator 104f directly transitions from the state DCOC_NOI to the state DCOE_END.

An FSM of the carrier frequency offset estimator 104d is as shown in FIG. 3B. An initial state of the carrier frequency offset estimator 104d is CFOE_START. When the carrier frequency offset estimator 104d is triggered by an input control signal EN_CFOE from the processor 104a, the carrier frequency offset estimator 104d transitions to a state CFOE_SIG. In this state CFOE_SIG, the carrier frequency offset estimator 104d estimates CFO in the I-arm and Q-arm output samples of the digital frequency down converter 104g during a signal period. After the estimation, the carrier frequency offset estimator 104d transitions to a state CFOC_SIG. In this state CFOC_SIG, the carrier frequency offset estimator 104d transmits an output data signal $C_1$ to the carrier frequency offset compensator 104h in the BBIC 104. Further, the carrier frequency offset estimator 104d sets an output control signal CFOE_DONE to be high. The carrier frequency offset estimator 104d transitions to a final state CFOE_END.

Figure 4:
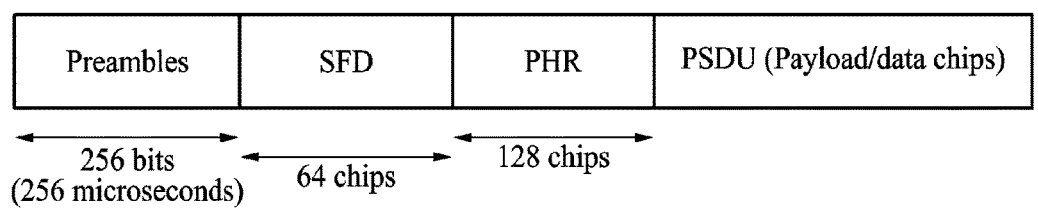
FIG. 4 illustrates an example of an IEEE 802.15.4q physical layer packet format.

FIG. 4 illustrates an example of an IEEE 802.15.4q physical layer packet format.

An IEEE 802.15.4q ULP physical layer packet for the IEEE 802.15.4 wireless personal area network (WPAN) standard is provided. As depicted in FIG. 4, a header portion includes a plurality of preambles, an SFD, and a PHY header (PHR). A payload portion, termed as a PHY service data unit (PSDU), includes actual data. The preambles of the packet format are used for PD, AGC, DCOC, and timing synchronization (sync). The SFD is used for frame synchronization. The PHR is used to convey a modulation scheme used along with PSDU length information. The preambles and SFD are collectively referred to as a synchronization header (SHR).

Figure 5A:
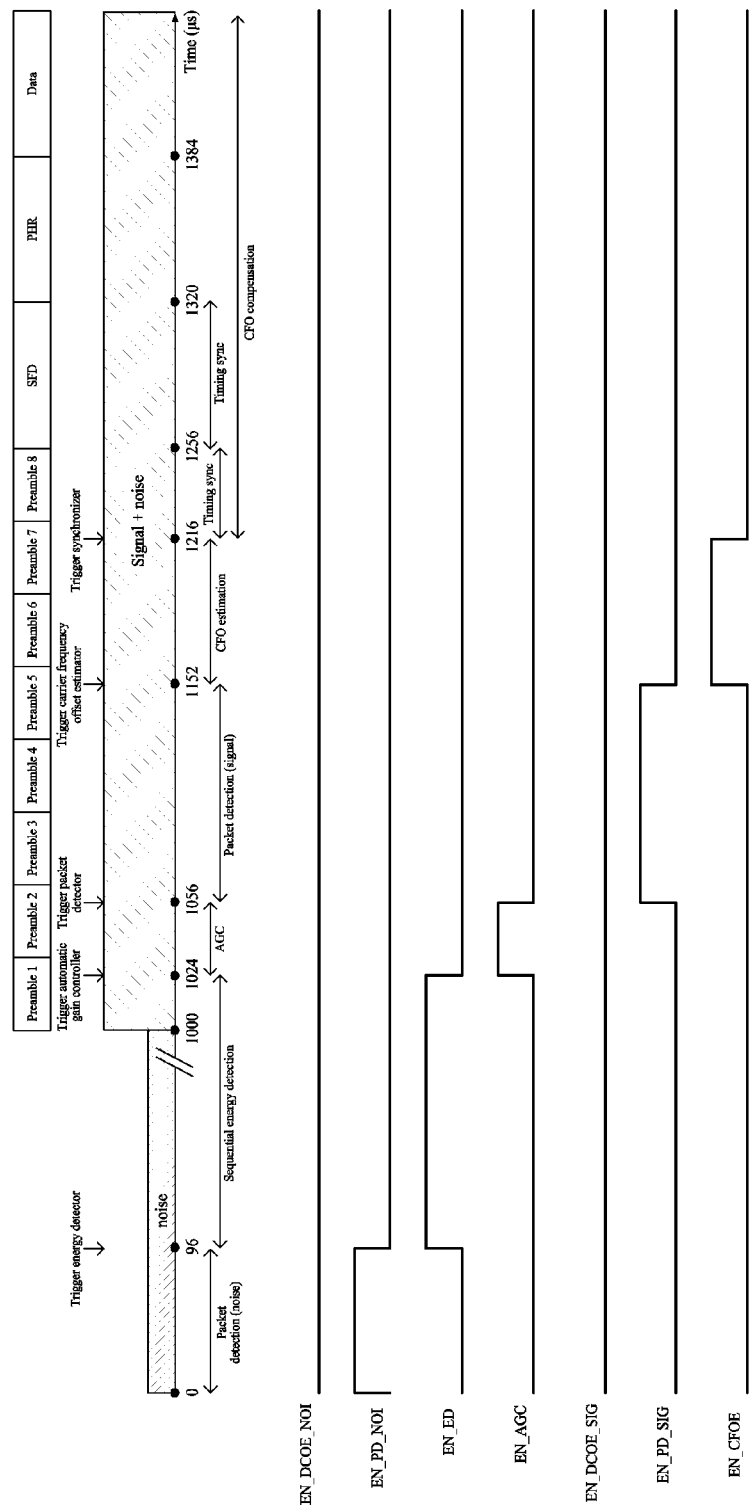
FIGS. 5A and 5B illustrate examples of timing diagrams and control signals associated with the components of FIG. 1.
Figure 5B:
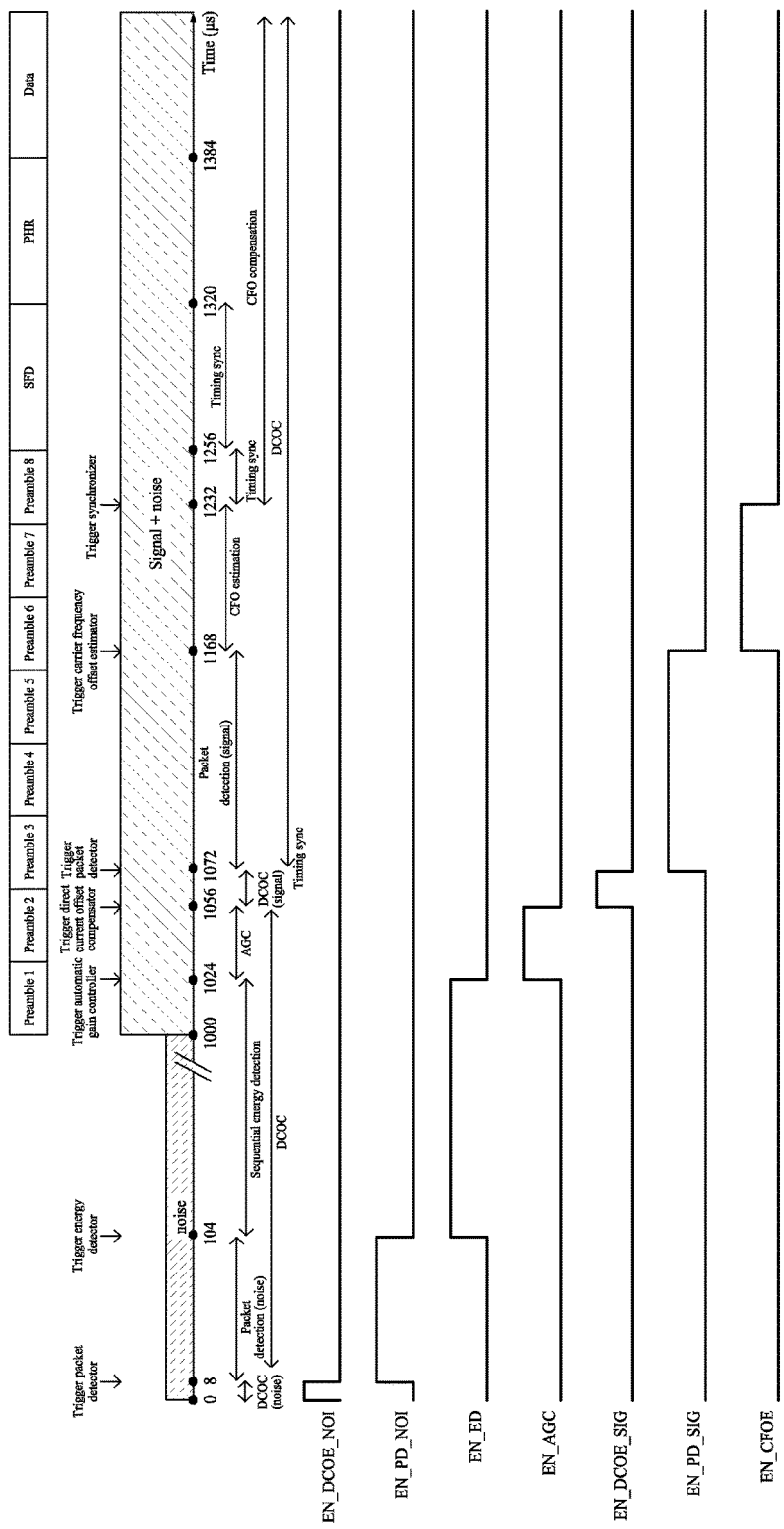

FIGS. 5A and 5B illustrate examples of timing diagrams and control signals associated with the components of FIG. 1.

As depicted in FIG. 5B, a noise period is between zero μs and thousand μs. After thousand μs, a signal period is initiated. The signal period may be considered as a "post noise period". In the noise period, the direct current offset estimator 104f and the packet detector 104c are enabled for performing computations. The direct current offset estimator 104f is enabled between 0 μs and 8 μs, and the packet detector 104c is enabled from 8 μs to 104 μs (for example, for duration of 96 μs).

The direct current offset estimator 104f dynamically compensates for unknown offset voltage values $B_I$ and $B_Q$ of a pair of input sequences in the noise period between 0 μs and 8 μs.

The packet detector 104c computes a first peak autocorrelation value of an autocorrelation function in the noise period between 8 μs to 104 μs. The computed first peak autocorrelation value of the autocorrelation function in the noise period is stored in the packet detector 104c for future use (for instance, during the post noise period).

The energy detector 104b is enabled from 104 μs to 1024 μs. The energy detector 104b computes total variances of a pair of input sequences over time windows of an equal duration in the noise period and the signal period, as depicted in FIG. 5B. The energy detector 104b computes a relative variance value by computing a difference between each total variance of each time window and a reference value in the noise period and the signal period. Further, the energy detector 104b determines whether the computed relative variance value exceeds a predetermined threshold for a predetermined number of consecutive time windows. From FIG. 5B, it should be noted that the energy detector 104b utilizes three consecutive time windows (in one example, each window having a duration of 8 μs) in the signal period.

The automatic gain controller 104e is enabled from 1024 μs to 1056 μs. The automatic gain controller 104e dynamically adjusts a gain of the pair of input sequences when the signal period is initiated.

Further, the direct current offset estimator 104f is enabled from 1056 μs to 1072 μs (for example, for 16 μs). In the signal period, the direct current offset estimator 104f compensates the unknown offset values.

Also, the packet detector 104c is enabled for packet detection from 1072 μs to 1168 μs during the signal period. During the signal period, the packet detector 104c distinguishes an intended packet (for example, an IEEE 802.15.4q physical layer packet) from a plurality of packets. From FIG. 5B, the packet detector 104c utilizes three preambles (for example, 96 μs) to distinguish the intended packet from the plurality of packets.

Further, the carrier frequency offset estimator 104d is enabled from 1168 μs to 1232 μs during the signal period. From FIG. 5B, it should be noted that the carrier frequency offset estimator 104d utilizes two preambles (for example, 64 μs) for estimating the CFO. From 1232 μs till the end of packet, the unknown CFO is compensated for by the carrier frequency offset compensator 104h and the digital frequency down converter 104g in the BBIC 104.

Further, the timing synchronizer is enabled from 1232 μs to 1256 μs.

As depicted in FIG. 5A, the noise period is between zero μs and thousand μs. After thousand μs, the signal period is initiated. The direct current offset estimator 104f is disabled during the noise period as well as the signal period, as depicted in FIG. 5A.

In the noise period, the packet detector 104c is enabled to perform computations. The packet detector 104c is enabled from 0 μs to 96 μs (for example, for a duration of 96 μs). The packet detector 104c computes the first peak autocorrelation value of the autocorrelation function in the noise period between 0 μs to 96 μs. The computed first peak autocorrelation value of the autocorrelation function in the noise period is stored in the packet detector 104c for future use (for example, during the signal period).

The energy detector 104b is enabled from 96 μs to 1024 μs. The energy detector 104b computes total variances of the pair of input sequences over time windows of an equal duration in the noise period and the signal period, as depicted in FIG. 5A. The energy detector 104b computes a relative variance value by computing a difference between each total variance of each time window and a reference value in the noise period and the signal period. Further, the energy detector 104b determines whether the computed relative variance value exceeds a predetermined threshold for a predetermined number of consecutive time windows. From FIG. 5A, the energy detector 104b utilizes three consecutive time windows (in one instance, each window having a duration of 8 μs) in the signal period.

The automatic gain controller 104e is enabled from 1024 μs to 1056 μs. The automatic gain controller 104e dynamically adjusts a gain of the pair of input sequences when the signal period is initiated.

Further, the packet detector 104c is enabled for packet detection from 1056 μs to 1152 μs during the signal period. During the signal period, the packet detector 104c distinguishes an intended packet (for example, an IEEE 802.15.4q physical layer packet) from a plurality of packets. From FIG. 5A, the packet detector 104c utilizes three preambles (for example, 96 μs) to distinguish the intended packet from the plurality of packets.

Further, the carrier frequency offset estimator 104d is enabled from 1152 μs to 1216 μs during the signal period. From FIG. 5A, the carrier frequency offset estimator 104d utilizes 64 μs for estimating the CFO. From 1216 μs till the end of packet, the unknown but estimated CFO is compensated for by the carrier frequency offset compensator 104h in the BBIC 104.

Further, the timing synchronizer is enabled from 1216 μs to 1256 μs.

Figure 6A:
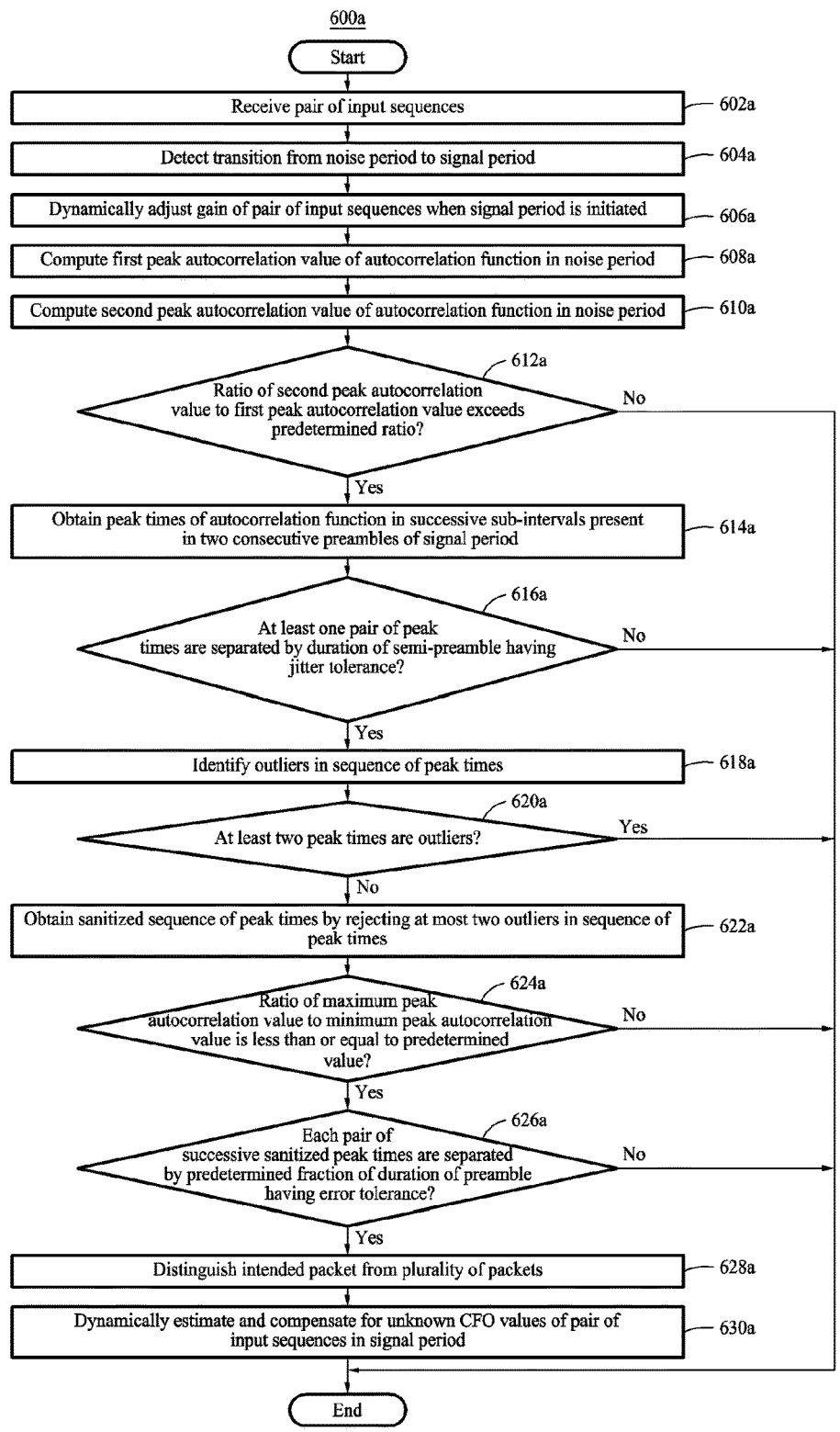
FIG. 6A is a flowchart illustrating an example of a method to distinguish an intended packet from a plurality of packets, in accordance with an embodiment.

FIG. 6A is a flowchart illustrating an example of a method 600a to distinguish an intended packet from a plurality of packets, in accordance with an embodiment.

Referring to FIG. 6A, in operation 602a, the method 600a includes receiving a pair of input sequences from the RFIC 102. The processor 104a receives the pair of input sequences from the RFIC 102. The pair of input sequences include a plurality of preambles and data.

In operation 604a, the method 600a includes detecting a transition from a noise period to a signal period in the pair of input sequences. The energy detector 104b detects the transition from the noise period to the signal period in the pair of input sequences.

The energy detector 104b detects energy in order to significantly reduce a number of false alarms. The energy detector 104b determines conditions (as indicated or reflected in Equations 1, 2 and 3 below) in the pair of input sequences in order to detect the transition from the noise period to the signal period.

The energy detector 104b determines total variances of the pair of input sequences over time windows of an equal duration in the noise period. Further, the energy detector 104b computes a relative variance value by computing a difference between each total variance of each time window and a reference value. The relative variance value is computed using Equations 1, 2 and 3 as mentioned below.

$$V(k+1) - V_{ref}(k) \geq Th_{ED} \qquad \text{[Equation 1]}$$

$$V(k+2) - V_{ref}(k) \geq Th_{ED} \qquad \text{[Equation 2]}$$

$$V(k+3) - V_{ref}(k) \geq Th_{ED} \qquad \text{[Equation 3]}$$

In Equations 1 through 3, $Th_{ED}$ denotes an ED threshold and $V_{ref}(k)$ denotes a reference value for a total variance in an ED window $k^{th}$.

In an example, a time budget for sequential ED is 24 μs (within a PHY preamble). An appropriate value of $Th_{ED}$ is 0.65 dB.

The reference value $V_{ref}(k)$ is computed in an auto-regressive manner.

In a first time window, $V_{ref}(k)=V(1)$. In the time window $k^{th}$. $V_{ref}(k)=0.2 \times V(k)+0.8 \times V_{ref}(k-1)$. Here, k>1.

However, the successive ED (for three time windows, for example) described above may not distinguish between noise followed by an IEEE 802.15.4q physical layer packet and noise followed by a BT/BLE/GFSK/WLAN packet, unless the packet detector 104c is triggered by the processor 104a.

In operation 606a, the method 600a includes dynamically adjusting a gain of the pair of input sequences when the signal period is initiated. The automatic gain controller 104e dynamically adjusts the gain of the pair of input sequences when the signal period is initiated.

In operation 608a, the method 600a includes computing a first peak autocorrelation value of an autocorrelation function in the noise period. The packet detector 104c computes the first peak autocorrelation value of the autocorrelation function in the noise period.

In an example, a window includes output samples of the ADC-I 102a and the ADC-Q 102b spanning 32 μs, for example, [t, t+32] μs. Let x(r) denote a baseband signal received at a time r in μs. For example, x(r) is a continuous time analog signal which is given as an input to the ADC-I 102a and the ADC-Q 102b. The packet detector 104c computes a first partial autocorrelation function.

$$R(t) = \left| \int_{\tau=t+5}^{t+6} x(\tau)x^*(\tau+2)d\tau + \int_{\tau=t+8}^{t+9} x(\tau)x^*(\tau+2)d\tau + \int_{\tau=t+16}^{t+17} x(\tau)x^*(\tau+2)d\tau + \int_{\tau=t+29}^{t+30} x(\tau)x^*(\tau+2)d\tau - \int_{\tau=t}^{t+1} x(\tau)x^*(\tau+2)d\tau - \int_{\tau=t+13}^{t+14} x(\tau)x^*(\tau+2)d\tau - \int_{\tau=t+21}^{t+22} x(\tau)x^*(\tau+2)d\tau - \int_{\tau=t+24}^{t+25} x(\tau)x^*(\tau+2)d\tau \right|$$ [Equation 4]

In terms of samples $X(k) = x(kT_s)$ of the ADC-I 102a and the ADC-Q 102b and an oversampling ratio OSR, Equation 4 may be rewritten as Equation 5.

$$R(nT_s) = \left| \sum_{l \in S_g} \sum_{k=1}^{OSR} X[n+k+(l-1) \times OSR]X^*[n+k+(l+1) \times OSR] - \sum_{l \in S_m} \sum_{k=1}^{OSR} X[n+k+(l-1) \times OSR] X^*[n+k+(l+1) \times OSR] \right|$$ [Equation 5]

Index sets $S_p$ and $S_m$ are given by $S_p = \{6, 9, 17, 30\}$ and $S_m = \{1, 14, 22, 25\}$, respectively.

A maximum value of a function R(t) for t∈[0,64] μs is determined by sliding a time window in steps of (1/OSR) μs. Thus, for three oversampling ratios OSR, the time window is slid from [0.125,32] μs to [0.25,32.125] μs and so on up to [64.125,96] μs. The first peak autocorrelation value over the slide duration is saved as a reference value α for future use. Thus, $$\alpha = \max_{t \in [0,64]\mu s} R(t).$$

In operation 610a, the method 600a includes computing a second peak autocorrelation value of the autocorrelation function in the post noise period. The packet detector 104c computes the second peak autocorrelation value of the autocorrelation function in the post noise period.

In an example, it is considered that $t_x$ μs is a time at which the processor 104a triggers the packet detector 104c. The output samples of the ADC-I 102a and the ADC-Q 102b are buffered over a window [t,t+32] μs and the samples are extracted from corresponding sub-intervals. The partial autocorrelation function R(t) is computed by the packet detector 104c. Further, the left edge of the window t is slid by 64 μs in steps of (1/OSR) μs=0.33 μs and the second peak autocorrelation value of the function R(t) is computed. The second peak autocorrelation value is computed using Equation 6.

$$\beta = \max_{t \in [t_r, t_r+64]\mu s} R(t)$$ [Equation 6]

In operation 612a, the method 600a includes determining whether a ratio of the second peak autocorrelation value β to the first peak autocorrelation value α exceeds a predetermined ratio. The packet detector 104c determines whether the ratio of the second peak autocorrelation value β to the first peak autocorrelation value α exceeds the predetermined ratio.

In operation 614a, the method 600a includes obtaining peak times of the autocorrelation function in successive sub-intervals present in two consecutive preambles of the signal period. The packet detector 104c obtains the peak times of the autocorrelation function in the successive sub-intervals present in the two consecutive preambles of the signal period.

The slide interval $[t_r, t_r+64]$ μs is partitioned into four equal sub-intervals of 16 μs each. Thus, the sub-intervals are $[t_r, t_r+16]$ μs, $[t_r+16, t_r+32]$ μs and so on, up to $[t_r+48, t_r+64]$ μs. Further, for every sub-interval, a peak of R(t) and a corresponding time are determined. More particularly, values of the peak times are determined using Equations 7, 8 and 9.

$$t_1^* = \operatorname*{argmax}_{t \in [t_r, t_r+16]\mu s} R(t)$$ [Equation 7]

$$t_2^* = \operatorname*{argmax}_{t \in [t_r+16, t_r+32]\mu s} R(t)$$ [Equation 8]

$$t_4^* = \operatorname*{argmax}_{t \in [t_r+48, t_r+64]\mu s} R(t)$$ [Equation 9]

In operation 616a, the method 600a includes determining whether at least one pair of successive peak times are separated by a duration of a semi-preamble having a jitter tolerance. The packet detector 104c determines whether at least one pair of successive peak times are separated by the duration of the semi-preamble having the jitter tolerance. For example, the determination is made to check whether peak times corresponding to the consecutive sub-intervals are separated by a semi-preamble duration (16 μs) within a jitter tolerance of (OSR/2) samples. In terms of the peak times, the following conditions as given in Equations 10, 11, and 12 are verified.

(16−0.5) μs ≤ $t_2^* - t_1^*$ ≤ (16+0.5) μs [Equation 10]

(16−0.5) μs ≤ $t_3^* - t_2^*$ ≤ (16+0.5) μs [Equation 11]

(16−0.5) μs ≤ $t_4^* - t_3^*$ ≤ (16+0.5) μs [Equation 12]

In operation 618a, the method 600a includes identifying outliers in the sequence of peak times. The packet detector 104c identifies the outliers in the sequence of peak times.

Every peak time $t^*_k$, with respect to a left edge of a 16-µs slide window, is adjusted using Equations 13, 14, and 15.

$$\tau^*_1 = t^*_1 - t_r \quad \text{[Equation 13]}$$

$$\tau^*_2 = t^*_2 - (t_r + 16) \quad \text{[Equation 14]}$$

$$\tau^*_4 = t^*_4 - (t_r + 48) \quad \text{[Equation 15]}$$

An un-sanitized sequence of relative peak times is as given in Equation 16.

$$G_u = (\tau^*_1, \tau^*_2, \ldots, \tau^*_4) \quad \text{[Equation 16]}$$

In operation 620a, the method 600 includes determining whether at least two peak times are outliers. The packet detector 104c determines whether at least two peak times are outliers.

In operation 622a, the method 600a includes obtaining a sanitized sequence of peak times by rejecting, at most, one outlier in the sequence of peak times. The packet detector 104c obtains the sanitized sequence of the peak times by rejecting, at most, one outlier in the sequence of peak times.

It is considered that $\tau^*_m$ denotes a median value of a sequence $G_s$. In a case in which any relative peak time $\tau^*_k$ differs from the median value $\tau^*_m$ by more than 2 µs, a peak time is defined as an outlier and should be rejected. More particularly, the sanitized sequence of relative peak times is constructed according to Equation 17 as given below.

$$G_s = (\tau^*_k; \tau^*_k \in G_u \text{ and } |\tau^*_k - \tau^*_m| \le 2 \text{ µs}; k=1, \ldots, 4) \quad \text{[Equation 17]}$$

In operation 624a, the method 600a includes determining whether a ratio of a maximum peak autocorrelation value to a minimum peak autocorrelation value is less than a predetermined value. The packet detector 104c determines whether the ratio of the maximum peak autocorrelation value to the minimum peak autocorrelation value is less than the predetermined value. For example, the predetermined value is 2.5.

In operation 626a, the method 600a includes determining whether each pair of successive sanitized peak times are separated by a predetermined fraction of a duration of a preamble having an error tolerance. The packet detector 104c determines whether each pair of successive sanitized peak times are separated by the predetermined fraction of the duration of the preamble having the error tolerance.

The values of the relative peak times in the sanitized sequence $G_s$, are examined to determine whether the relative peak times are reasonably close to each other. Re-indexing is performed on the values of the relative peak times and $G_s$ is denoted using Equation 18.

$$G_s = (\tau^*_{k_1}, \tau^*_{k_2}, \ldots, \tau^*_{k_N}) \text{ where } N \le 4 \quad \text{[Equation 18]}$$

For example, if $G_s = (\tau^*_2, \tau^*_3, \tau^*_4)$, and $k_1 = 2$, $k_2 = 3$ and $k_3 = 4$. It is verified whether successive times are within 1 µs. More specifically, the following determinations are performed with Equations 19, 20, and 21.

$$|\tau^*_{k_2} - \tau^*_{k_1}| \le 1 \text{ µs} \quad \text{[Equation 19]}$$

$$|\tau^*_{k_3} - \tau^*_{k_2}| \le 1 \text{ µs} \quad \text{[Equation 20]}$$

$$|\tau^*_{k_N} - \tau^*_{k_{N-1}}| \le 1 \text{ µs} \quad \text{[Equation 21]}$$

In operation 628a, the method 600a includes distinguishing an intended packet from a plurality of intended packets. The packet detector 104c distinguishes the intended packet from the plurality of packets. It is determined that a fine check has passed and the packet detector 104c declares that an IEEE 802.15.4q coherent preamble is reliably detected.

In operation 630a, the method 600a includes dynamically estimating and compensating for unknown CFO values of the pair of input sequences $\{y_1(n), y_Q(n)\}$ in the signal period. The carrier frequency offset estimator 104d dynamically estimates the unknown CFO values of the pair of input sequences in the signal period.

FIG. 6B is a flowchart illustrating an example of a method 600b of sequencing various components to distinguish an intended packet from a plurality of packets, in accordance with an embodiment.

The time instances at which the various components are enabled to distinguish an intended packet from a plurality of packets are illustrated in FIG. 5A, and hence only the sequencing of the components is described herein.

Referring to FIG. 6B, in operation 602b, the method 600b includes receiving a pair of input sequences from the RFIC 102. The processor 104a receives the pair of input sequences from the RFIC 102. The pair of input sequences includes a plurality of preambles and data.

In operation 604b, the method 600b includes detecting a transition from a noise period to a signal period in the pair of input sequences. The energy detector 104b detects the transition from the noise period to the signal period in the pair of input sequences.

In operation 606b, the method 600b includes dynamically adjusting a gain of the pair of input sequences when the signal period is initiated. The automatic gain controller 104e dynamically adjusts the gain of the pair of input sequences when the signal period is initiated.

In operation 608b, the method 600b includes distinguishing an intended packet from a plurality of packets received based on a plurality of preambles. The packet detector 104c distinguishes the intended packet from the plurality of packets received based on the plurality of preambles.

In operation 610b, the method 600b includes dynamically estimating and compensating for unknown CFO values of the pair of input sequences in the signal period. The carrier frequency offset estimator 104d dynamically estimates the unknown CFO values of the pair of input sequences in the signal period.

FIG. 6C is a flowchart illustrating an example of a method 600c of sequencing various components to distinguish an intended packet from a plurality of packets, in accordance with an embodiment.

Referring to FIG. 6C, in operation 602c, the method 600c includes computing a first peak autocorrelation value of an autocorrelation function in a noise period. The packet detector 104c computes the first peak autocorrelation value of the autocorrelation function in the noise period.

In operation 604c, the method 600c includes computing total variances of the pair of input sequences over time windows of an equal duration in the noise period and a signal period. The energy detector 104b computes the total variances of the pair of input sequences over the time windows of the equal duration in the noise period and the signal period.

In operation 606c, the method 600c includes computing a relative variance value by computing a difference between each total variance of each time window and a reference value. The energy detector 104b computes the relative variance value by computing the difference between each total variance of each time window and the reference value.

In operation 608c, the method 600c includes determining whether the relative variance value exceeds a predetermined threshold for a predetermined number of consecutive time windows. The energy detector 104b determines whether the relative variance value exceeds the predetermined threshold for the predetermined number of consecutive time windows.

In operation 610c, the method 600c includes dynamically adjusting a gain of the pair of input sequences when the signal period is initiated. The automatic gain controller 104e dynamically adjusts the gain of the pair of input sequences when the signal period is initiated.

In operation 612c, the method 600c includes distinguishing an intended packet from a plurality of packets received based on a plurality of preambles. The packet detector 104c distinguishes the intended packet from the plurality of packets received based on the plurality of preambles.

In operation 614c, the method 600c includes dynamically estimating and compensating for unknown CFO values of the pair of input sequences during the signal period. The carrier frequency offset estimator 104d dynamically estimates the unknown CFO values of the pair of input sequences during the signal period.

FIG. 6D is a flowchart illustrating an example of a method 600d of sequencing various components to distinguish an intended packet from a plurality of packets, in accordance with an embodiment.

Referring to FIG. 6D, in operation 602d, the method 600d includes dynamically estimating and compensating for unknown offset voltage values of a pair of input sequences in a noise period. The direct current offset estimator 104f dynamically estimates and compensates for the unknown offset voltage values of the pair of input sequences in the noise period. In the noise period, the direct current offset estimator 104f and the packet detector 104c are enabled to perform computations. The direct current offset estimator 104f is enabled between 0 µs and 8 µs, and the packet detector is enabled from 8 µs to 104 µs (for example, for a duration of 96 µs), as depicted in FIG. 5B.

The direct current offset compensator 102c dynamically compensates for unknown offset voltage values $B_I$ and $B_Q$ of the pair of input sequences in the noise period from 8 µs till the end of packet.

In operation 604d, the method 600d includes computing a first peak autocorrelation value of an autocorrelation function in the noise period. The packet detector 104c computes the first peak autocorrelation value of the autocorrelation function in the noise period. The packet detector 104c computes the first peak autocorrelation value of the autocorrelation function in the noise period between 8 µs and 104 µs. The computed first peak autocorrelation value of the autocorrelation function in the noise period is stored in the packet detector 104c for future use, for example, during a signal period.

In operation 606d, the method 600d includes computing total variances of the pair of input sequences over time windows of an equal duration in the noise period and the signal period. The energy detector 104b computes the total variances of the pair of input sequences over the time windows of the equal duration in the noise period and the signal period. The energy detector 104b µs enabled from 104 µs to 1024 µs. The energy detector 104b computes the total variances of the pair of input sequences over the time windows of the equal duration in the noise period and the signal period.

In operation 608d, the method 600d includes computing a relative variance value by computing a difference between each total variance of each time window and a reference value. The energy detector 104b computes the relative variance value by computing the difference between each total variance of each time window and the reference value. For instance, the energy detector 104b computes the relative variance value by computing the difference between each total variance of each time window and the reference value in the noise period and the signal period.

In operation 610d, the method 600d includes determining whether the relative variance value exceeds a predetermined threshold for a predetermined number of consecutive time windows. The energy detector 104b determines whether the relative variance value exceeds the predetermined threshold for the predetermined number of consecutive time windows.

In operation 612d, the method 600d includes dynamically adjusting a gain of the pair of input sequences when the signal period is initiated. The automatic gain controller 104e dynamically adjusts the gain of the pair of input sequences when the signal period is initiated. The automatic gain controller 104e is enabled from 1024 µs to 1056 µs.

In operation 614d, the method 600d includes dynamically estimating and compensating for unknown offset voltage values of the pair of input sequences in the signal period. The direct current offset estimator 104f dynamically estimates and compensates for the unknown offset voltage values of the pair of input sequences in the signal period. The direct current offset estimator 104f µs enabled from 1056 µs to 1072 µs (for example, for 16 µs). In the signal period, the direct current offset compensator 102c compensates for the unknown offset values from 1072 µs till the end of the packet.

In operation 616d, the method 600d includes distinguishing an intended packet from the plurality of packets received based on a plurality of preambles. The packet detector 104c distinguishes the intended packet from the plurality of packets received based on the plurality of preambles. The packet detector 104c is enabled for packet detection from 1072 µs to 1168 µs during the signal period. During the signal period, the packet detector 104c distinguishes the intended packet (for example, an IEEE 802.15.4q physical layer packet) from the plurality of packets. From FIG. 5B, the packet detector 104c utilizes three preambles (for example, 96 µs) to distinguish the intended packet from the plurality of packets.

In operation 618d, the method 600d includes dynamically estimating and compensating for unknown CFO values of the pair of input sequences during the signal period. The carrier frequency offset estimator 104d dynamically estimates the unknown CFO values of the pair of input sequences during the signal period.

Figure 7:
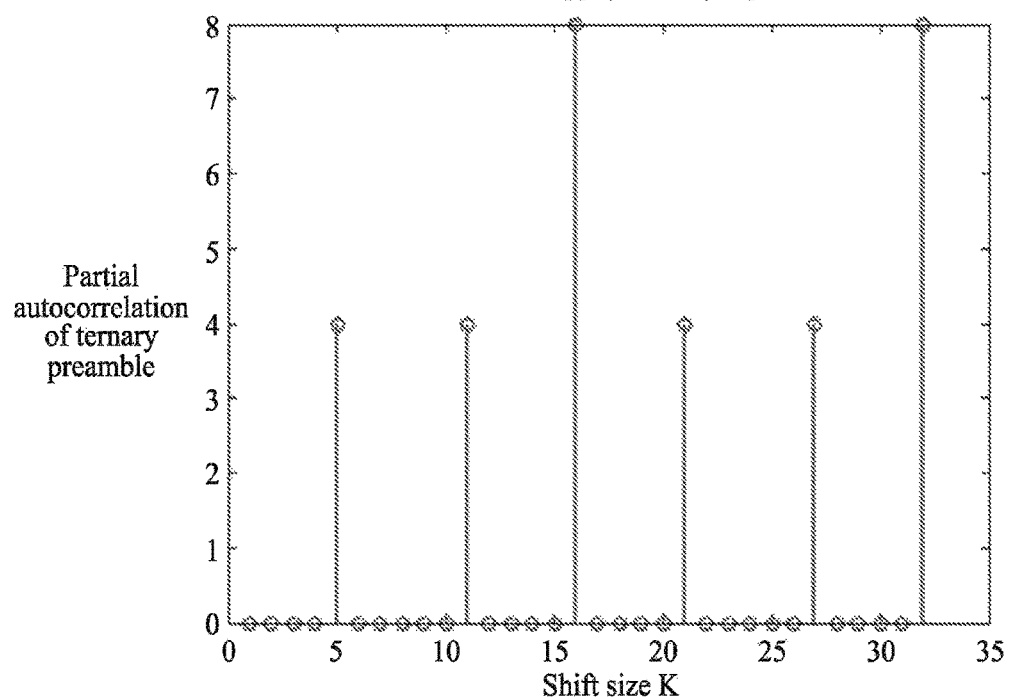
FIG. 7 is a graph illustrating an example of a partial autocorrelation of a coherent preamble sequence, in accordance with an embodiment.

FIG. 7 is a graph illustrating an example of a partial autocorrelation of a coherent preamble sequence.

A basic 32-chip ternary preamble sequence present in an 802.15.4q physical layer packet is given by Equation 22.

$$T_0 = [1\ 0\ -1\ 0\ 0\ -1\ 0\ -1, 1\ 0\ 1\ 0\ 0\ -1\ 0\ 1, 1\ 0\ 1\ 0\ 0\ -1\ 0\ 1, -0\ 1\ 0\ 0\ 1\ 0\ 1] \quad \text{[Equation 22]}$$

It is observed that $T_0 = [A, B, B, -A]$, where $A = [1\ 0\ -1\ 0\ 0\ -1\ 0\ -1]$ and $B = [1\ 0\ 1\ 0\ 0\ -1\ 0\ 1]$ are 8-µs sub-preambles that constitute the coherent preamble $T_0$. $T_k$ denotes the sequence $T_0$ cyclically shifted k elements to the right. For example, $T_4$ is given by Equation 23.

$$T_4 = [0\ 1\ 0\ 1\ 1\ 0\ -1\ 0, 0\ -1\ 0\ -1\ 1\ 0\ 1\ 0, 0\ -1\ 0\ 1\ 1\ 0\ 1\ 0, 0\ -1\ 0\ 1-1\ 0\ 1\ 0] \quad \text{[Equation 23]}$$

For the ternary preamble sequence $T_0$, "minus terms" are defined as those terms which, when multiplied by terms two positions to the right thereof, yield −1. A corresponding "minus index set" is given by Equation 24.

$$S_m = \{1,14,22,25\} \quad \text{[Equation 24]}$$

Analogously, with respect to $T_0$, "plus terms" are defined as those terms which, when multiplied by terms two positions to the right thereof, yield +1. A corresponding "plus index set" is given by Equation 25.

$$S_p = \{6, 9, 17, 30\} \quad \text{[Equation 25]}$$

The objective of PD is to determine whether an incoming PHY packet is an IEEE 802.15.4q PHY packet. Furthermore, it has to also determine a starting index of the coherent preamble $T_0$.

The essence of PD is to perform autocorrelation of received chips (or samples of the ADC-I 102a and the ADC-Q 102b expressed as complex numbers) at "minus indices" and "plus indices" with right shift size of two chips. Specifically, for a sequence $T_k$, the following computations are performed. First, a sum of products $\Sigma_m$ is computed for indices taken from the minus index set $S_m$.

$$\Sigma_m := T_k(1)T^*_k(3) + T_k(14)T^*_k(16) + T_k(22)T^*_k(24) + T_k(25)T^*_k(27) \quad \text{[Equation 26]}$$

In Equation 26, $T_k(m) \in \{-1, 0, 1\}$ denotes an $m^{th}$ term of the ternary preamble sequence $T_k$. Next, a sum of products $\Sigma_p$ is computed for indices taken from the plus index set $S_p$.

$$\Sigma_p := T_k(6)T^*_k(8) + T_k(9)T^*_k(11) + T_k(17)T^*_k(19) + T_k(30)T^*_k(32) \quad \text{[Equation 27]}$$

Finally, a difference of the above defined sums of products is calculated, and an absolute value thereof is defined as a partial autocorrelation γ.

$$\therefore \gamma = |\Sigma_p - \Sigma_m| \quad \text{[Equation 28]}$$

The above computation of γ exhibits peaks with a periodicity of 16 chips (in other words, 16 μs). That is, the peaks occur for $T_0$ and $T_{16}$, but not for other values of cyclic shifts, such as $T_5$ and $T_{19}$. This fact is illustrated in FIG. 7. The peak value of 8 occurs at shift sizes k=16, 32. The value of γ for shift sizes in the vicinity of these peaks is zero. More specifically, from FIG. 7, the following points are to be noted.

The value of γ for shift sizes adjacent to these peaks is zero. That is, γ=0 for shift sizes k=16±1, 32±1 (modulo 32).

The value of γ for shift sizes of two positions from the peaks is zero. Thus, y=0 for shift sizes k=16±2, 32±2, (modulo 32).

The value of γ for shift sizes of three positions from the peaks is also zero. That is, γ=0 for shift sizes k=16±3, 32±3 (modulo 32).

Therefore, a ratio of a peak value of an adjacent value is very high (that is, the ratio tends to be infinity), which remains true even if transmitted pulses are Gaussian shaped and received chips are corrupted (or changed) by noise samples. Further, the ratio of the peak value of the adjacent value is very high infers a starting point of a semi-preamble [A B] or a semi-preamble [B–A]. Furthermore, this fact may also be utilized to reduce a time budget of a timing synchronization algorithm.

Figure 8A:
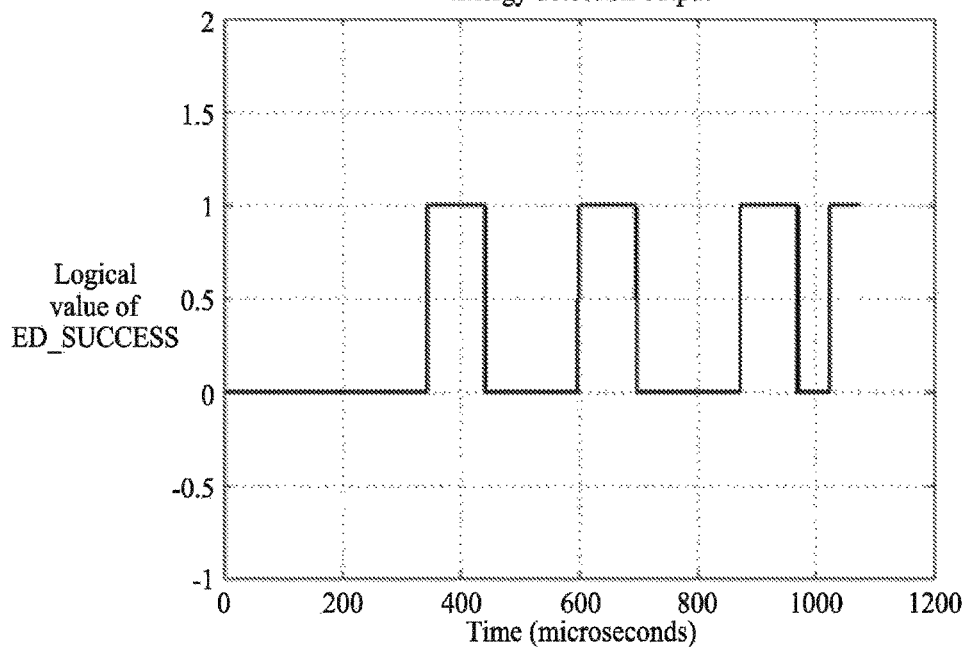
Figure 8B:
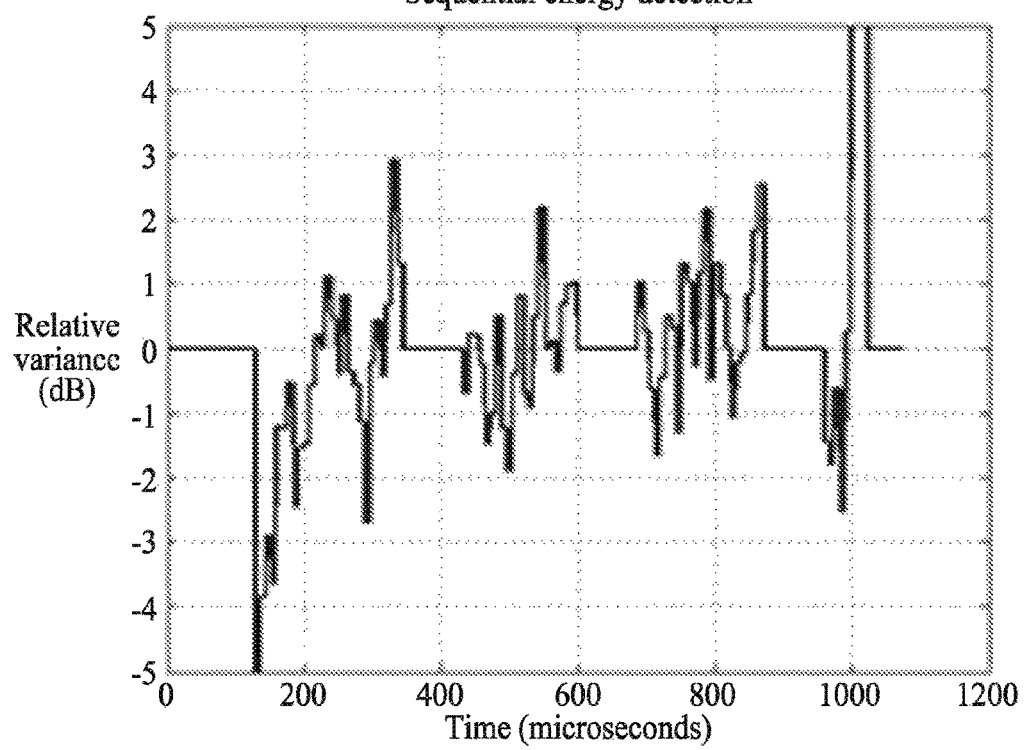

FIGS. 8A through 8C are graphs illustrating examples of ED during a noise period and a post noise period.

Control signal output of the energy detector 104b during the noise period and the signal period is shown in FIG. 8A. In FIG. 8A, an x axis corresponds to a time t in is, while a y axis corresponds to a value of ED_SUCCESS. From FIG. 8A, it should be noted that ED_SUCCESS is high (logic "1") for four times during an interval [0, 1500] μs.

A corresponding relative variance $V(k+m) - V_{ref}(k)$ (with respect to the time is shown in FIG. 8B, where m=1, 2, 3. It should be noted that an ED window $k^{th}$ corresponds to a time interval [(k−1)T, kT], where T=8 μs is a duration of the ED window. An ED threshold is $Th_{ED}$=0.65 dB.

For example, an operation of the energy detector 104b from 840 μs to 872 μs is described herein. A relative variance during this time interval is observed clearly from FIG. 8C. During the ED window [840,848] μs, a value of $V_{ref}(k)$ is −6.03 dBm. An FSM of the energy detector 104b μs at a state ED_COMPUTE_VAR. During the ED window [848, 856] μs, the value of V(k+1)=−5.21 dBm. Thus, the relative variance is 0.82 dB, which is also shown in FIG. 8C. Since the relative variance exceeds the ED threshold of $Th_{ED}$=0.65 dB, the FSM of the energy detector 104b transitions to ED_HIGH_1. During a subsequent ED window [856,864] μs, V(k+2)+−4.23 dBm. The relative variance is 1.80 dB, which exceeds the ED threshold. Thus, the FSM of the energy detector 104b transitions to ED_HIGH_2. During a subsequent ED window [864, 872] μs, V(k+3)=−3.49 dBm. The relative variance of 2.54 dB again exceeds the ED threshold. Hence, the FSM of the energy detector 104b transitions to ED_END, and the output control signal ED_SUCCESS is set to be high (logic "1"). Further, the processor 104a triggers the automatic gain controller 104e at a time 872 μs.

FIGS. 8D through 8H are graphs illustrating examples of PD during a noise period and a post noise period.

An illustration of the efficacy of IEEE 802.15.4q coherent preamble detection is provided. A scenario in which 1000 μs of a noise interval is followed by an 802.15.4q PHY received signal. A BB modulation scheme is a 1/1 TASK (data rate D1) with an SNR of 13 dB.

Figure 8D:
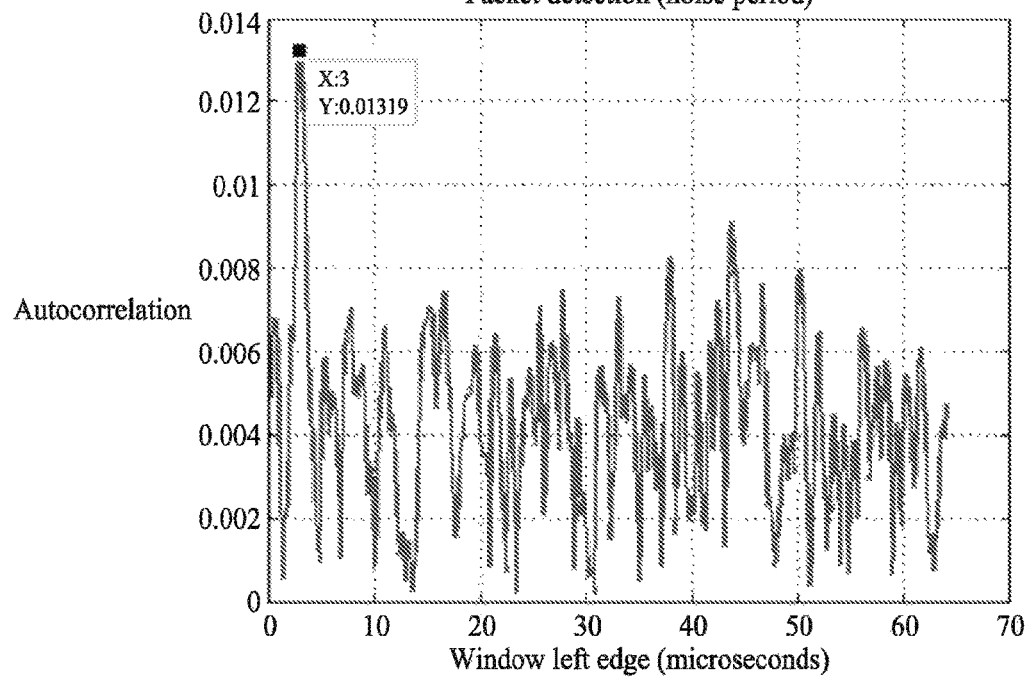

An output of the packet detector 104c during an initial noise period of [0, 96] μs is shown in FIG. 8D. An x axis corresponds to a window left edge t, while a y axis corresponds to a value of a partial autocorrelation function R(t). After sliding a 32-μs window by 64 μs, a peak value of R(t) is $\alpha = 1.319 \times 10^{-2}$. This is saved as a reference value for a coarse check. Output control signals are PD_NOI_DONE=1 and PD_SIG_DONE=0. During the "pose noise period", the packet detector 104c is triggered by the processor 104a at tr=368 μs. A plot of R(t) for t∈[368,432] μs is shown in FIG. 8E. A peak value thereof is $\beta = 1.117 \times 10^{-2}$, Because β/α<2, a basic check (for example, ratio condition) has failed, and the packet detector 104c returns to a state PD_TRIG_ED. Output control signals are PD_SIG_DONE=1 and PD_SUCCESS=0.

Figure 8F:
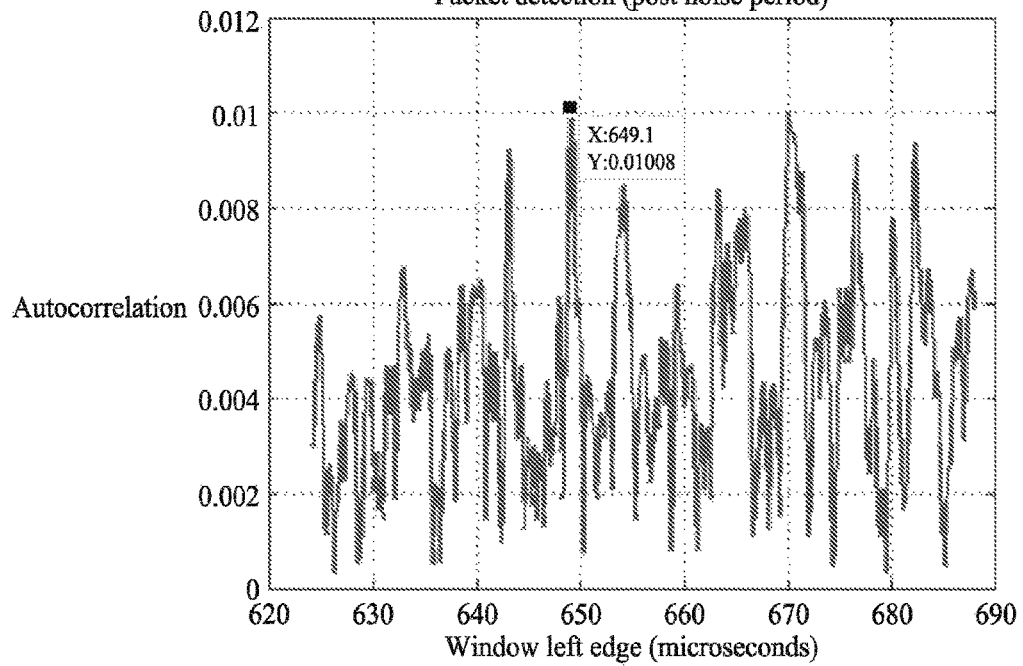

The packet detector 104c is triggered by the processor 104a at tr=624 μs. A plot of R(t) for t∈[624,688] μs is shown in FIG. 8F. A peak value is $\beta = 1.008 \times 10^{-2}$. Since β/α<2, a basic check has failed. The processor 104a triggers the energy detector 104b. Output control signals are PD_SIG_DONE=1 and PD_SUCCESS=0.

The packet detector 104c is triggered by the processor 104a at tr=896 μs. A plot of R(t) for t∈[896,960] μs is shown in FIG. 8G. A peak value is $\beta = 6.14 \times 10^{-1}$. Because β/α>2, a basic check has passed and a coarse check is performed. A slide interval is partitioned into four equal sub-intervals of 16 μs each: [896,912] μs, [912,928] μs, [928,944] μs, and [944,960] μs. For these sub-intervals, the respective peak times are obtained as $t^*_1$=903.125 μs, $t^*_2$=924.25 μs, $t^*_3$=937.375 μs, and $t^*_4$=953.375 μs. Because 15.5 μs≤$t^*_4$−$t^*_3$≤16.5 μs, a coarse check has passed and an outlier check is performed. For this, an initial sequence of relative peak times is obtained as $G_u = (\tau^*_1, \tau^*_2, \tau^*_3, \tau^*_4) = (7.125, 12.25, 9.375, 9.375)$ μs. A median value is $\tau^*_m$=9.375 μs. A sanitized sequence of the relative peak times is $G_s$=(9.375, 9.375) μs because remaining two values differ from the median value by more than 2 μs. Because at least two outliers are found, an outlier check fails, and the packet detector 104c returns to a state PD_TRG_ED. The processor 104a triggers the energy detector 104b. Output control signals are PD_SIG_DONE=1 and PD_SUCCESS=0.

The packet detector 104c is triggered by the processor 104a at tr=1008 μs. FIG. 8H shows a plot of autocorrelation R(t) for t∈[1008,1072] μs. A peak value is β=7.233×10$^{-1}$. Because β/α>2, a basic check is cleared and a coarse check is investigated. After partitioning the slide interval into four sub-intervals of 16 μs each, a sequence of peak times is $(t^*_1, t^*_2, t^*_3, t^*_4)$=(1017, 1033, 1049, 1065) μs.

Because $t^*_2 - t^*_1$=16 μs, a coarse check passes and an outlier check stage is performed. An initial sequence of relative peak times is $G_u = (\tau^*_1, \tau^*_2, \tau^*_3, \tau^*_4)$=(9, 9, 9, 9) μs. As all values are equal, there is no outlier and the sanitized sequence is equal to the initial sequence. Hence, $G_s$=(9, 9, 9, 9) μs. Because an outlier check has passed, a fine check is performed. Further, all successive relative peak times in $G_s$ are within 1 μs of each other. Thus, the fine check has passed. Therefore, an IEEE 802.15.4q coherent preamble (physical layer packet) has been detected. Output control signals are PD_SIG_DONE=1 and PD_SUCCESS=1.

Figure 9:
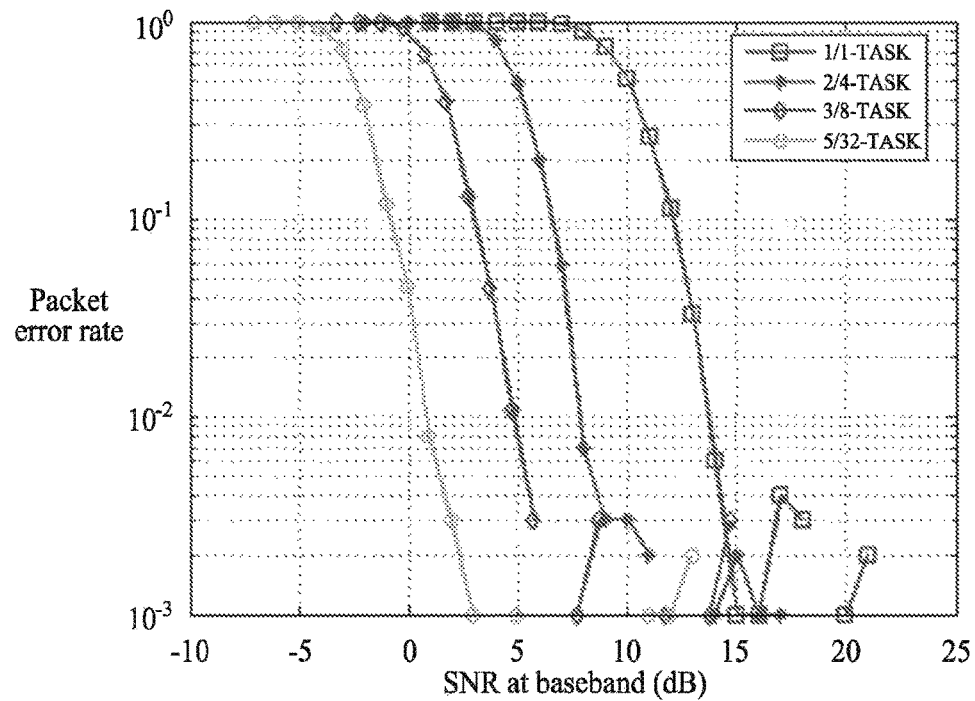
FIG. 9 is a graph illustrating an example of a variation of a packet error rate (PER) with a baseband signal-to-noise ratio (SNR) performance of an SIF coherent receiver with a non-coded IEEE 802.15.4q physical layer packet.

FIG. 9 is a graph illustrating an example of a variation of a packet error rate (PER) with a baseband SNR performance of an SIF coherent receiver with a non-coded IEEE 802.15.4q physical layer packet.

The PER with the SNR performance for various data rates with all outer receiver methods (ED, PD, AGC and DCOC) turned ON is measured. The graph of FIG. 9 shows the performance without FEC and interleaving on a PSDU portion of a packet.

Figure 10:
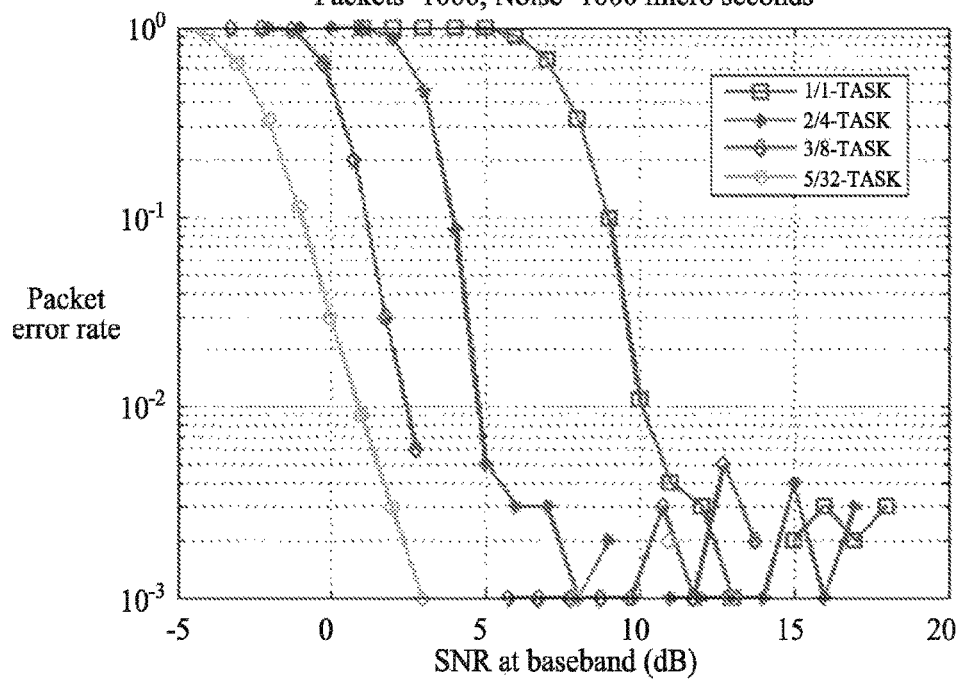
FIG. 10 is a graph illustrating an example of a variation of a PER with a baseband SNR performance of an SIF coherent receiver with a coded IEEE 802.15.4q physical layer packet.

FIG. 10 is a graph illustrating an example of a variation of a PER with a baseband SNR performance of an SIF coherent receiver with a coded IEEE 802.15.4q physical layer packet.

Corresponding sensitivity values for a 1% PER are listed in Table 3. A receiver sensitivity for a data rate D1 is 13.7 dB, which is consistent with results in the existing systems. As expected, a higher value of a PSDU spreading factor leads to a lower value of the receiver sensitivity. Also, FEC and interleaving improve the sensitivity by about 3 dB, except for a 5/32 TASK.

TABLE 3

| Baseband MCS | BB receiver sensitivity at 1% PER (dB) | |
| --- | --- | --- |
| | Without FEC and Interleaving | With FEC and Interleaving |
| 1/1 TASK | 13.7 | 10.1 |
| 2/4 TASK | 7.8 | 4.7 |
| 3/8 TASK | 4.8 | 2.4 |
| 5/32 TASK | 0.8 | 0.8 |

The RFIC, the digital frequency down converter, the carrier frequency offset compensator, the energy detector, the packet detector, the carrier frequency offset estimator, the automatic gain controller, the direct current offset estimator and the processor in FIGS. 1 through 3B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 6A through 6D that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to detect a packet, the method comprising:
   detecting a transition from a noise period to a signal period in a pair of input sequences received based on a relative variance value of time windows computed from total variances of the pair of input sequences;
   dynamically adjusting a gain of the pair of input sequences in response to the signal period being initiated;
   distinguishing an intended packet from packets received based on preambles included in the pair of input sequences; and
   compensating for a carrier frequency offset of the intended packet in the signal period.

2. The method of claim 1, wherein the pair of input sequences comprises an in-phase input sequence and a quadrature phase input sequence.

3. The method of claim 1, wherein the compensating comprises estimating the carrier frequency offset in the signal period.

4. The method of claim 1, wherein unknown offset voltage values of the pair of input sequences are dynamically compensated for in the signal period prior to distinguishing the intended packet from the packets.

5. The method of claim 1, wherein the distinguishing comprises:
   computing a first peak autocorrelation value of an autocorrelation function in the noise period;
   computing a second peak autocorrelation value of the autocorrelation function in the signal period;
   determining whether a ratio of the second peak autocorrelation value to the first peak autocorrelation value exceeds a ratio; and
   obtaining peak times of the autocorrelation function in successive sub-intervals present in two consecutive preambles of the signal period.

6. The method of claim 5, wherein the distinguishing further comprises:
   determining whether a pair of peak times are separated by a duration of a preamble having a jitter tolerance;
   identifying outliers in the peak times; and
   obtaining sanitized peak times by rejecting at most one outlier in the peak times.

7. The method of claim 6, wherein the distinguishing further comprises:
   determining whether a ratio of a maximum peak autocorrelation value to a minimum peak autocorrelation value from the sanitized peak times is less than a threshold value;
   determining whether each pair of successive sanitized peak times are separated by a fraction of a duration of a preamble having an error tolerance; and
   distinguishing the intended packet from the packets in response to determining that each pair of successive sanitized peak times are separated by the fraction of the duration of the preamble having the error tolerance.

8. The method of claim 1, wherein the detecting comprises:
   computing the total variances of the pair of input sequences over the time windows of an equal duration in the noise period and the signal period;
   computing the relative variance value by computing a difference between each total variance of each of the time windows and a reference value; and
   determining whether the relative variance value exceeds a threshold for a number of consecutive time windows.

9. The method of claim 1, wherein the detecting comprises:
   dynamically compensating for unknown offset voltage values of the pair of input sequences in the noise period; and computing a first peak autocorrelation value of an autocorrelation function in the noise period.

10. The method of claim 1, wherein the intended packet is an IEEE 802.15.4q physical layer packet.

11. An ultra low power (ULP) wireless receiver, comprising:
a processor configured to
detect a transition from a noise period to a signal period in a pair of input sequences received based on a relative variance value of time windows computed from total variances of the pair of input sequences,
dynamically adjust a gain of the pair of input sequences in response to the signal period being initiated,
distinguish an intended packet from packets received based on preambles included in the pair of input sequences, and
compensate for a carrier frequency offset of the intended packet in the signal period.

12. The ULP wireless receiver of claim 11, wherein the pair of input sequences comprises an in-phase input sequence and a quadrature phase input sequence.

13. The ULP wireless receiver of claim 11, wherein the processor is further configured to:
estimate the carrier frequency offset in the signal period.

14. The ULP wireless receiver of claim 11, wherein the processor is further configured to:
dynamically compensate for unknown offset voltage values of the pair of input sequences in the signal period prior to distinguishing the intended packet from the packets.

15. The ULP wireless receiver of claim 11, wherein the processor is configured to:
compute a first peak autocorrelation value of an autocorrelation function in the noise period,
compute a second peak autocorrelation value of the autocorrelation function in the signal period,
determine whether a ratio of the second peak autocorrelation value to the first peak autocorrelation value exceeds a ratio, and
obtain peak times of the autocorrelation function in successive sub-intervals present in two consecutive preambles of the signal period.

16. The ULP wireless receiver of claim 15, wherein the processor is configured to:
determine whether a pair of peak times are separated by a duration of a preamble having a jitter tolerance,
identify outliers in the peak times, and
obtain sanitized peak times by rejecting at most one outlier in the peak times.

17. The ULP wireless receiver of claim 16, wherein the processor is configured to:
determine whether a ratio of a maximum peak autocorrelation value to a minimum peak autocorrelation value from the sanitized peak times is less than a threshold value,
determine whether each pair of successive sanitized peak times are separated by a fraction of a duration of a preamble having an error tolerance, and
distinguish the intended packet from the packets in response to determining that each pair of successive sanitized peak times are separated by the fraction of the duration of the preamble having the error tolerance.

18. The ULP wireless receiver of claim 11, wherein the processor is configured to:
compute the total variances of the pair of input sequences over the time windows of an equal duration in the noise period and the signal period,
compute the relative variance value by computing a difference between each total variance of each of the time windows and a reference value, and
determine whether the relative variance value exceeds a threshold for a number of consecutive time windows.

19. The ULP wireless receiver of claim 11, wherein the processor is configured to:
dynamically compensate for unknown offset voltage values of the pair of input sequences in the noise period, and
compute a first peak autocorrelation value of an autocorrelation function in the noise period.

20. The ULP wireless receiver of claim 11, wherein the intended packet is an IEEE 802.15.4q physical layer packet.

* * * * *